United States Patent
Tokutani et al.

(10) Patent No.: US 7,549,172 B2
(45) Date of Patent: Jun. 16, 2009

(54) DATA PROCESSING APPARATUS FOR DIGITAL COPYRIGHTS MANAGEMENT

(75) Inventors: Takashi Tokutani, Kawasaki (JP);
Takahisa Hatakeyama, Kawasaki (JP);
Keishiro Tanaka, Kawasaki (JP);
Masakazu Yura, Nagoya (JP);
Teruyoshi Nagaoka, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 902 days.

(21) Appl. No.: 10/945,225

(22) Filed: Sep. 20, 2004

(65) Prior Publication Data

US 2005/0185792 A1 Aug. 25, 2005

(30) Foreign Application Priority Data

Feb. 25, 2004 (JP) .......................... 2004-049164

(51) Int. Cl.
*H04L 9/32* (2006.01)
*H04L 9/00* (2006.01)
*H04N 7/16* (2006.01)

(52) U.S. Cl. ............................. 726/27; 726/26; 726/29; 726/32; 380/30; 380/258; 380/285; 380/277; 380/282; 705/59; 705/51

(58) Field of Classification Search ........... 380/30, 380/285, 277, 278, 282, 258; 705/59, 51; 726/28, 29, 32, 26, 27; 713/156
See application file for complete search history.

(56) References Cited

U.S. PATENT DOCUMENTS

| | | | | |
|---|---|---|---|---|
| 5,502,766 A * | 3/1996 | Boebert et al. | ............. | 713/193 |
| 5,995,625 A * | 11/1999 | Sudia et al. | ................. | 705/51 |
| 6,161,139 A * | 12/2000 | Win et al. | ................. | 709/225 |
| 6,219,652 B1 * | 4/2001 | Carter et al. | ................. | 705/59 |
| 6,223,291 B1 * | 4/2001 | Puhl et al. | ................. | 726/28 |
| 6,697,944 B1 * | 2/2004 | Jones et al. | ................. | 713/168 |
| 6,873,975 B1 * | 3/2005 | Hatakeyama et al. | ........ | 705/51 |
| 6,931,530 B2 * | 8/2005 | Pham et al. | ................. | 713/165 |
| 6,973,444 B1 * | 12/2005 | Blinn et al. | ................. | 705/51 |
| 7,010,808 B1 * | 3/2006 | Leung et al. | ................. | 726/26 |
| 7,036,011 B2 * | 4/2006 | Grimes et al. | ............... | 713/156 |
| 7,065,787 B2 * | 6/2006 | Ganesan et al. | ............... | 726/21 |
| 7,073,063 B2 * | 7/2006 | Peinado | ................. | 713/171 |
| 7,136,838 B1 * | 11/2006 | Peinado et al. | ............... | 705/59 |
| 7,152,245 B2 * | 12/2006 | Dublish et al. | ............... | 726/29 |

(Continued)

FOREIGN PATENT DOCUMENTS

JP 2002-207600 A 7/2002

(Continued)

OTHER PUBLICATIONS

Pretty Good Privacy, Inc., PGP® For Business Security For Windows 95/NT User's Guide, 1997, Pretty Good Privacy, Inc. <http://www.ncsa.uiuc.edu/People/ncsairst/pgp/PGP55win.pdf>.*

(Continued)

*Primary Examiner*—David García Cervetti
(74) *Attorney, Agent, or Firm*—Fujitsu Patent Center

(57) ABSTRACT

Data processing apparatus distributes a public key certificate and information about a private key to a user terminal as activation information separately from a terminal module. In the case where the public key certification is vulnerable, it transmits only the activation information again.

22 Claims, 46 Drawing Sheets

U.S. PATENT DOCUMENTS

Figure 1:

| | | | |
|---|---|---|---|
| 7,272,858 B2* | 9/2007 | Parks et al. | 726/28 |
| 7,318,236 B2* | 1/2008 | DeMello et al. | 726/26 |
| 7,353,402 B2* | 4/2008 | Bourne et al. | 713/193 |
| 7,370,212 B2* | 5/2008 | Bourne et al. | 713/193 |
| 7,380,280 B2* | 5/2008 | de Jong | 726/27 |
| 7,383,205 B1* | 6/2008 | Peinado et al. | 705/26 |
| 7,398,557 B2* | 7/2008 | de Jong | 726/29 |
| 7,404,084 B2* | 7/2008 | Fransdonk | 713/176 |
| 7,472,270 B2* | 12/2008 | Evans et al. | 713/155 |
| 2002/0007456 A1* | 1/2002 | Peinado et al. | 713/164 |
| 2003/0037006 A1* | 2/2003 | Maruyama et al. | 705/59 |
| 2003/0051151 A1* | 3/2003 | Asano et al. | 713/193 |
| 2003/0074356 A1* | 4/2003 | Kaler et al. | 707/9 |
| 2003/0149670 A1* | 8/2003 | Cronce | 705/59 |
| 2003/0165241 A1* | 9/2003 | Fransdonk | 380/258 |
| 2003/0194093 A1* | 10/2003 | Evans et al. | 380/282 |
| 2003/0217011 A1* | 11/2003 | Peinado et al. | 705/59 |
| 2003/0233549 A1* | 12/2003 | Hatakeyama et al. | 713/170 |
| 2003/0233561 A1* | 12/2003 | Ganesan et al. | 713/193 |
| 2004/0001594 A1* | 1/2004 | Krishnaswamy et al. | 380/277 |
| 2004/0003268 A1* | 1/2004 | Bourne et al. | 713/193 |
| 2004/0003269 A1* | 1/2004 | Waxman et al. | 713/193 |
| 2004/0003270 A1* | 1/2004 | Bourne et al. | 713/193 |
| 2004/0054920 A1* | 3/2004 | Wilson et al. | 713/200 |
| 2004/0078581 A1* | 4/2004 | Dublish et al. | 713/189 |
| 2004/0127196 A1* | 7/2004 | Dabbish et al. | 455/411 |
| 2004/0158709 A1* | 8/2004 | Narin et al. | 713/156 |
| 2004/0168073 A1* | 8/2004 | Bourne et al. | 713/193 |
| 2004/0172533 A1* | 9/2004 | DeMello et al. | 713/164 |
| 2004/0187001 A1* | 9/2004 | Bousis | 713/175 |
| 2004/0193546 A1* | 9/2004 | Tokutani et al. | 705/59 |
| 2004/0243815 A1* | 12/2004 | Tsukamura | 713/193 |
| 2004/0243819 A1* | 12/2004 | Bourne et al. | 713/193 |
| 2005/0071278 A1* | 3/2005 | Simelius | 705/52 |
| 2005/0114672 A1* | 5/2005 | Duncan et al. | 713/182 |
| 2005/0132207 A1* | 6/2005 | Mourad | 713/189 |
| 2005/0132209 A1* | 6/2005 | Hug et al. | 713/189 |
| 2005/0235361 A1* | 10/2005 | Alkove et al. | 726/27 |
| 2006/0167815 A1* | 7/2006 | Peinado et al. | 705/59 |

FOREIGN PATENT DOCUMENTS

JP 2003-092565 A 3/2003

OTHER PUBLICATIONS

T. Anazawa et al. "Open Superdistribution Infrastructure Realizing the Tenacity of the Content Protection" EIP14-5, pp. 31-42, Nov. 30, 2001.

"Japanese Office Action", dated Mar. 24, 2009, Partial English translation in corresponding JP Patent Application No. 2004-049164.

\* cited by examiner

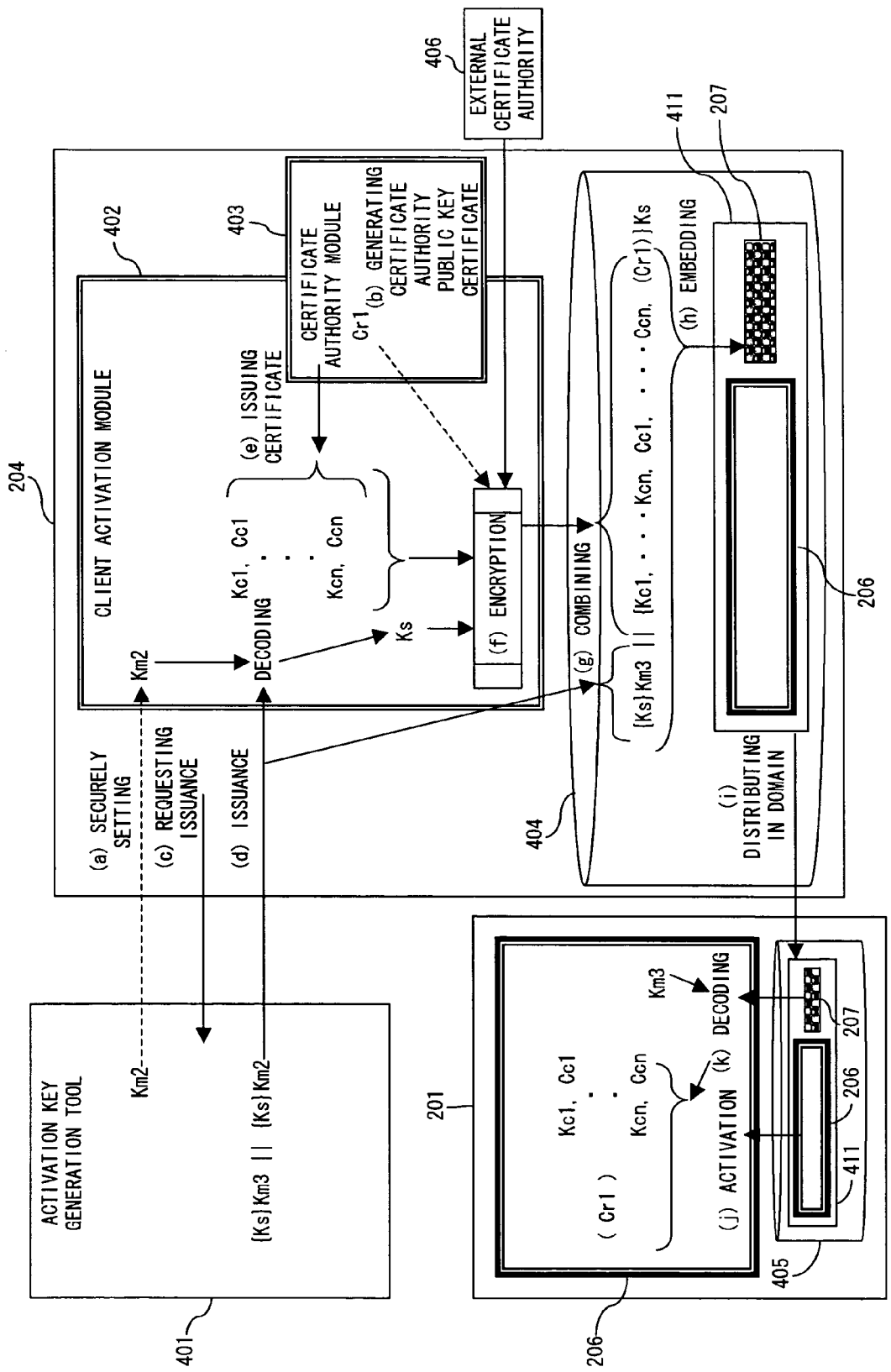
F I G. 4

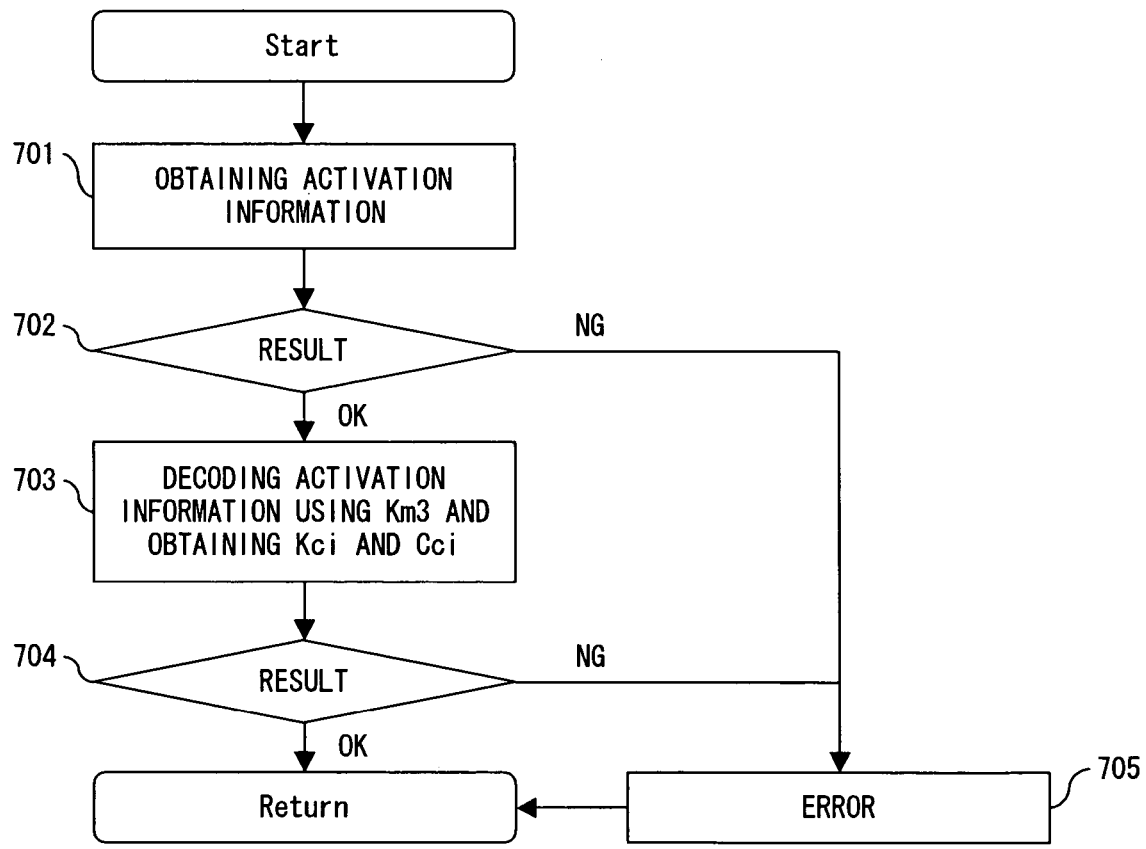
F I G. 7

| LicenseInfo STRUCTURE | | content_id ‖transaction_id ‖ decode_information ‖acl | |
|---|---|---|---|
| | Size | | VARIABLE LENGTH |
| | Data | | SEQUENCE TYPE STRUCTURED DATA |
| | protocol_version | | LICENSE TRANSMISSION PROTOCOL VERSION |
| | | Size | 2-BYTE FIXED |
| | | Data | BIT STRNG TYPE. bit 0 IS SET TO LSB. EACH BIT CORRESPONDS TO FOLLOWING EACH PROTOCOL VERSION AND IF BIT IS On(1), LICENSE CAN BE INTERPRETED BY MEDIUM DRM MOUNTED WITH THIS PROTOCOL VERSION.<br>bit0 : Version 1<br>bit1 : Version 2<br>BIT OF VERSION DEFINED BY RES-OPEN MUST BE On(1) AT-LEAST |
| | content_id [license_id] | | CONTENT ID [LICENSE ID] |
| | | Size | VARIABLE LENGTH |
| | | Data | CONTENTS ID [LICENSE ID]<br>OCTET STRING TYPE |
| | transaction_id | | TRANSACTION ID |
| | | Size | 12-BYTE FIXED |
| | | Data | TRANSACTION ID AT ISSUANCE<br>OCTET STRING TYPE |
| | license_script_spec | | PRESENT LICENSE FORM AND INFORMATION ABOUT SPECIFICATION OF INTERPRETATION THEREOF |
| | | Size | VARIABLE LENGTH |
| | | Data | FORM OF LICENSE INFO DESCRIPTION AND INFORMATION DETERMINING PRINCIPLE OF INTERPRETATION THEREOF ARE STORED. IT IS INTERPRETED THAT UDAC VERSATILE RIGHT DESCRIPTION SPECIFICATION IS SELECTED IF THIS OPTION IS OMITTED. IT IS INDISPENSABLE TO SET TWO FIELDS SUCH AS decode_information AND acl<br>IN CASE WHERE ACLEntryS HAVING DIFFERENT VALUES OF rights_script_spec EXIST IN SAME LICENSEINFO AND INDIVIDUAL LICENSE GENERATION POLICES OF A PLURALITY OF ACLEntryS ARE DIFFERENT AMONG A PLURALITY OF PIECES OF rights_script_spec, INDIVIDUAL LICENSE GENERATION IS PERFORMED WHILE PRIORITIZING THE POLICIES OF TWO FIELDS. AT THIS TIME, THE POLICY DEPENDS ON THE MOUNTED SYSTEM WHEN TWO FIELDS ARE OMITTED. |

F I G. 8

| | | |
|---|---|---|
| | acm | ACm |
| | Size | VARIABLE LENGTH |
| | Data | Acm |
| | decode_information | CONTENT DECODING INFORMATION FOR DECODER DRM |
| | Size | VARIABLE LENGTH |
| | Data | SEQUENCE TYPE WITH DecodeInformation TAG<br>Kc OR ENCRYPTED LICENSE FOR DECODER DRM OR LIST THEREOF |
| | acl | ACL (ACCESS CONTROL LIST) |
| | Size | VARIABLE LENGTH |
| | Data | Acl STRUCTURE |
| | rpk_hash_list | USE LICENSE ROUTE PUBLIC KEY HASH LIST |
| | Size | VARIABLE LENGTH |
| | Data | ha_id IS INSERTED INTO HEAD IN AlgorithmIdentifier TYPE.<br>SUBSEQUENTLY, HASH VALUE LIST OF USE LICENSE ROUTE PUBLIC KEY IS INSERTED IN SEQUENCE OF BIT STRING TYPE.<br>IN CASE WHERE HASH VALUE OF ROUTE PUBLIC KEY USED FOR CHECKING CERTIFICATE DOES NOT EXIST IN CURRENTLY-DESIGNATED LIST, LICENSE MUST NOT BE ISSUED. |

FIG. 9

| Acl STRUCTURE | | | ACL (ACCESS CONTROL LIST) |
|---|---|---|---|
| Size | | | VARIABLE LENGTH |
| Data | | | SEQUENCE OF TYPE STRUCTURED DATA |
| | acl_entry | | ACL (ACCESS CONTROL LIST) ENTRY |
| | | Size | VARIABLE LENGTH |
| | | Data | ACLEntry STRUCTURE |
| | . <REPEATING> | | . |
| | acl_entry | | ACL (ACCESS CONTROL LIST) ENTRY |
| | | Size | VARIABLE LENGTH |
| | | Data | ACLEntry STRUCTURE |

FIG. 10

| ACLEntry STRUCTURE | | | principal \|\| acm \|\| acp |
|---|---|---|---|
| Size | | | VARIABLE LENGTH |
| Data | | | SEQUENCE TYPE |
| | rights_script | | APPLICATION CLASSIFICATION CORRESPONDING TO LICENSE FORM |
| | | Size | VARIABLE LENGTH |
| | | Data | AUTHORITY DESCRIPTION FORM AND INFORMATION DETERMINING INTERPRETATION PRINCIPLE ARE STORED |
| | operation | | KIND OF CONTENT (PROTECTION OBJECTS) USE OPERATIONS |
| | | Size | 1-BYTE FIXED |
| | | Data | 00h: play. DISPLAYING AND REPRODUCING<br>01h: print. PRINTING<br>02h: save. STORING<br>03h: parts_copy. PARTIALLY COPYING CONTENT DURING BEING DISPLAYED, REPRODUCED AND EDITED<br>OMISSION VALUE IS 00h (DISPLAY AND REPRODUCTION) |
| | principal_type | | LICENSE TARGET TYPE |
| | | Size | 1-BYTE FIXED |
| | | Data | 'A' : Authenticated one. AUTHENTICATED USER<br>'E' : Everyone. ALL USERS<br>'G' : GROUP ID<br>'U' : USER ID<br>'A' IS SET IN ACL TO BE REQUIRED AT GET-LICENSE AND IT IS USED. |
| | principal | | ID OF USER OR GROUP TO BE LICENSED |
| | | Size | VARIABLE LENGTH |
| | | Data | IN CASE OF LICENSE ISSUED FROM DISTRIBUTION SERVER OR MEDIA DRM, USER ID OBTAINED USING USER MANAGEMENT PLUG-IN MUST BE SET.<br>IN CASE WHERE principal_type IS 'E', CONTENT OF THIS FIELD MUST BE IGNORED. |
| | acm | | MEDIUM ACCESS CONDITION |
| | | Size | VARIABLE LENGTH |
| | | Data | Acm STRUCTURE |
| | acp | | DECODER ACCESS CONDITION |
| | | Size | VARIABLE LENGTH |
| | | Data | Acp STRUCTURE |

F I G. 1 1

| | authentication_list | | AUTHENTICATION METHOD CONDITION LIST |
|---|---|---|---|
| | | Size | VARIABLE LENGTH |
| | | Data | ONLY IN THE CASE WHERE EACH BIT IS MAPPED ONTO EACH AUTHENTICATION METHOD AND USER AUTHENTICATION IS NORMALLY TERMINATED IN ALL AUTHENTICATION METHODS IN WHICH A BIT IS on(1), A LICENSE IS ISSUED. IF EVEN ONE AUTHENTICATION PROCESSING ABNORMALLY TERMINATES, LICENSE ISSUANCE MUST BE DENIED.<br>THE FOLLOWING ARE AUTHENTICATION METHODS CORRESPONDING TO EACH BIT.<br>  0: ID/PASSWORD METHOD<br>  1: PKI AUTHENTICATION METHOD USING IC CARD<br>  2: FINGERPRINT AUTHENTICATION METHOD<br>  3: SIGNATURE AUTHENTICATION METHOD<br>  4: VEIN AUTHENTICATION METHOD<br>  5: FACE AUTHENTICATION METHOD<br>  6: RETINA AUTHENTICATION METHOD<br>  7: VOICEPRINT AUTHENTICATION METHOD<br>OMISSION VALUE OF THIS FIELD IS SET TO "ALL BITS ARE off". |
| | password_min_len | | MINIMUM LENGTH OF PASSWORD (BYTE LENGTH) |
| | | Size | 1 BYTE |
| | | Data | MINIMUM LENGTH OF INPUT PASSWORD IS INDICATED BY INTEGER NUMBER WITHOUT CODE.<br>MINIMUM LENGTH OF PASSWORD THAT USER TO BE LICENSED LICENSE INPUTS AND THAT IS LINKED WITH LICENSE IN MEDIUM DRM IS INDICATED BY BYTE LENGTH. MEDIUM DRM THAT RECEIVES LICENSE IN WHICH THIS FIELD EXISTS AND EFFECTIVE VALUE IS SET MUST REGISTER ONCE PASSWORD INPUTTED FROM A LOCAL USER AND COMPARES THE REGISTERED PASSWORD WITH PASSWORDS INPUTTED AT OR AFTER SECOND TIME. UNTIL PASSWORD HAVING LENGTH LONGER THAN VALUE DESIGNATED BY THIS FIELD IS INPUTTED, LICENSE MUST NOT BE LICENSED.<br>IN CASE WHERE VALUE OF THIS FIELD IS 0, OPERATION IS LICENSED WITHOUT INPUT OF PASSWORD.<br>THIS FIELD IS EFFECTIVE ONLY IN CASE WHERE BIT0 (ID/PASSWORD METHOD) OF authentication_list IS ON. |

FIG. 12

| | pw_input_period | | PERIOD WHILE PASSWORD CAN BE INPUTTED (SECOND) |
|---|---|---|---|
| | | Size | 4-BYTE FIXED |
| | | Data | IT IS INTERPRETED THAT DATA IS EXPRESSED BY INTEGER NUMBER WITHOUT CODE. UNIT IS REPRESENTED BY SECOND.<br>IN CASE WHERE FIELD IS OMITTED, FIELD IS INTERPRETED AS "INFINITE". TIME SINCE LICENSE IS OBTAINED UNTIL INPUT OF PASSWORD IS LICENSED. |
| | dn | | DN (Distinguished Name) OF USER OR GROUP TO BE LICENSED |
| | | Size | VARIABLE LENGTH |
| | | Data | RDNSequence STRUCTURE HAVING Dn TAG. STRUCTURE IS AS DEFINED BY [RFC 3280].<br>THIS FIELD IS ADDED WHEN DISTRIBUTION SERVER PASSES TO MEDIUM DRM.<br>WHEN LICENSE HAVING THIS FIELD IS USED USING MEDIUM DRM, FOLLOWING PROCESSINGS ARE PERFORMED IN MEDIUM DRM.<br>  1) CERTIFICATE OF IC CARD INSERTED INTO LOCAL SYSTEM IS TAKEN IN.<br>  2) VALIDITY OF CERTIFICATE IS CHECKED USING ROUTE PUBLIC KEY.<br>  3) IC CARD IS CONFIRMED USING CERTIFICATE.<br>IF ABOVE-MENTIONED CONFIRMATION IS NORMALLY TERMINATED, USE OF LICENSE IS GRANTED.<br>THIS FIELD IS EFFECTIVE ONLY IN CASE WHERE BIT1 (PKI AUTHENTICATION METHOD USING IC CARD) OF authentication_list IS ON. |
| | element_list | | LICENSE CONTENT ELEMENT NUMBER LIST |
| | | Size | VARIABLE LENGTH |
| | | Data | ElementList STRUCTURE<br>ELEMENT NUMBER OF CONTENT ELEMENT OF WHICH USE OPERATION IS GRANTED UNDER THIS ACLEntry CONDITION IS REPRESENTED IN LIST FORM. |

FIG. 13

| Acp STRUCTURE | | | flags \|\| operation_length \|\| not_after |
|---|---|---|---|
| Size | | | VARIABLE LENGTH |
| Data | | | RESTRICTION CONDITION LIST USED WHEN ENCRYPTED CONTENT ARE DECODED, DISPLAYED AND REPRODUCED USING REPRODUCTION GRANTED LICENSE. ONLY IN CASE OF SATISFYING ALL CONDITIONS, AUTHORITY TO DISPLAY AND REPRODUCE CONTENT IS EFFECTIVE. |
| | flags | | AGGREGATION OF ACCESS CONDITION DESTINATION FLAGS |
| | | Size | 1-BYTE FIXED |
| | | Data | CONTENT COMPRISES BIT STRINGS. EACH BIT HAS FOLLOWING MEANING. WHEN bit VALUE IS 0, FLAG WILL BE Off AND WHEN bit VALUE IS 1, FLAG WILL BE On. bit 0: OPERATIONAL SIZE RESTRICTION FLAG bit 1: OPERATION TIME LIMIT FLAG bit 2: PRINTING PROHIBITION FLAG bit 3: STORAGE PROHIBITION FLAG bit 4: PARTIALLY COPYING PROHIBITION FLAG bit 5: CAPTURE PROHIBITION FLAG WHEN CAPTURE IS ACCEPTED (Off), CONTENT OPERATION CAN BE PERFORMED EVEN FOR APPLICATION TO WHICH CAPTURE MEASURES ARE NOT TAKEN REGARDING INFORMATION EXCHANGE PERFORMED BETWEEN PROCESSES. |

FIG. 14

| | ext_flags | AGGREGATION OF EXTENSION ACCESS CONDITION DESIGNATION FLAGS |
|---|---|---|
| | Size | VARIABLE LENGTH |
| | Data | OCTET STRING TYPE HAVING ExtFlags TAG.<br>DATA COMPRISES BIT STRING. EACH BIT HAS FOLLOWING MEANING. bit 0 MEANS THAT FLAG IS Off WHILE bit 1 MEANS THAT FLAG IS On. (bit 0 IS LSB)<br>bit 0: SUPERPOSITION REPRODUCTION COMPULSORY FLAG<br>    (On: COMPULSORY/Off: NO SUPERPOSITION)<br>    WHEN COMPULSORY (On), USER ID AND REPRODUCTION DATE AND HOUR MUST BE SUPERPOSED ONTO REPRODUCTION CONTENT. DISTRIBUTION SERVER OR MEDIUM DRM ASSIGNS MEASURED LICENSE ISSUANCE TIME TO acl_entry. principal FIELD AND time_stamp FIELD IN LICENSE INFO AND ISSUES LICENSE.<br>bit 1: SUPERPOSITION PRINTING COMPULSORY FLAG<br>    (On: COMPULSORY/Off: NO SUPERPOSITION)<br>    WHEN COMPULSORY (On), USER ID AND PRINTING DATE AND HOUR MUST BE SUPERPOSED ONTO PRINTED CONTENT. DISTRIBUTION SERVER OR MEDIUM DRM ASSIGNS RIGHT VALUE TO acl_entry. principal FIELD AND time_stamp FIELD IN LICENSE INFO AND ISSUES LICENSE.<br>bit 2: INTERNAL CODE OUTPUT PROHIBITION FLAG<br>    (On:PROHIBITION/Off: PERMISSION)<br>    WHEN PROHIBITION (On), INTERNAL EXPRESSION SOURCE CODE OF CONTENT SUCH AS HTML, XML, SCRIPT, INTERMEDIATE LANGUAGE, ETC. MUSTNOT BE OUTPUTTED BY BEING DISPLAYED, PRINTED, ETC.<br>bit 3: SCREEN CAPTURE PROHIBITION FLAG<br>    (On:PROHIBITION/Off: PERMISSION)<br>    WHEN PROHIBITION (On), PERFORMANCE OF SCREEN PRINTING FUNCTION IS PROHIBITED.<br>bit 4: PLAINTEXT STORAGE PROHIBITION FLAG<br>    (On: PROHIBITION/Off: PERMISSION)<br>    WHEN PROHIBITION (On), CONTENT MUST NOT BE STORED IN PLAINTEXT FORM. ONLY IN CASE WHERE THIS FLAG IS Off AND STORAGE PROHIBITION flags OF FLAGS ARE ALSO Off, CONTENT CAN BE STORED IN PLAINTEXT FORM.<br>bit 5: MAIL ATTACHMENT PROHIBITION FLAG<br>    (On: PROHIBITION/Off: PERMISSION)<br>    WHEN PROHIBITION (On), CONTENT CANNOT BE ATTACHED TO MAIL. WHEN THIS FLAG IS Off, CONTENT IS PERMITTED TO BE ATTACHED TO MAIL.<br>bit 6: TRANSFER PROHIBITION FLAG<br>    (On: PROHIBITION/Off: PERMISSION)<br>    WHEN PROHIBITION (On), CONTENT TRANSMITTED BY MAIL, ETC., CANNOT BE TRANSFERRED. ONLY WHEN THIS FLAG IS Off, CONTENT CAN BE TRANSFERRED.<br>bit 7: Reserved. ALL FLAGS ARE SET TO Off (0).<br>    ext_flags DEFAULT VALUE OF EACH Operation LICENSE IS SET AS FOLLOWS<br>    play LICENSE : 0001 1000b (18h)<br>    print LICENSE : 0001 1000b (18h)<br>    save LICENSE : 0001 1000b (18h)<br>    copy LICENSE : 0001 1000b (18h) |

FIG. 15

| | operation_length | OPERATION LENGTH. TOTAL SIZE OF ENCRYPTED CONTENT THAT CAN BE OPERATED USING APPLICATION BY ONE OPERATION LICENSE. |
|---|---|---|
| | Size | 8-BYTE FIXED |
| | Data | OCTET STRING TYPE HAVING OperationLength TAG<br><br>TOTAL NUMBER OF BYTES THAT CAN BE OPERATED BY ONE OPERATION LICENSE<br><br>NUMBER OF BYTES COUNTED FROM HEAD OF ENCRYPTED CONTENT REPRESENTED BY INTEGER NUMBER WITHOUT CODE.<br><br>IN CASE OF WHERE OPERATIONAL SIZE RESTRICTION FLAG IS On AND NO FIELD EXISTS, OPERATION IS STOPPED. IN CASE WHERE OPERATIONAL SIZE RESTRICTION FLAG IS Off AND THIS FIELD EXISTS AND VALUE INVALIDATING VALUE OF THIS FIELD IS FFFFFFFFFFFFFFFFH, OPERATION CAN BE PERFORMED WITHOUT LIMIT.<br><br>IN CASE WHERE DESIGNATION IS PERFORMED TOGETHER WITH not_after, FLAG WHICH FIRST REACHES OPERATION SUSPENSION CONDITION BECOMES MORE EFFECTIVE. |

FIG. 16

| Acm STRUCTURE | | | operation_count \|\| move_count \|\| safe_level \|\| kept_period・・・ |
|---|---|---|---|
| | Size | | VARIABLE LENGTH |
| | Data | | RESTRICTION CONDITION LIST USED WHEN LICENSE IS DISTRIBUTED AND MOVED, AND REPRODUCTION IS GRANTED TO DECODER DRM. |
| | | operation_count | NUMBER OF OPERATIONS THAT IS GRANTED FOR CONTENT |
| | | Size | 1-BYTE FIXED |
| | | Data | NUMBER OF TIMES BY WHICH OPERATION LICENSE SUCH AS REPRODUCTION, DISPLAY, EXECUTION, PRINTING, ETC., CAN BE ISSUED TO DECODER DRM FROM DISTRIBUTION SERVER OR MEDIUM DRM. |

FIG. 17

| | control_flags | CONTROL FLAG GROUP |
|---|---|---|
| | Size | 1-BYTE FIXED |
| | Data | EACH BIT HAS FOLLOWING MEANING. WHEN bit VALUE IS 0, FLAG IS On WHILE WHEN bit VALUE IS 1, FLAG IS On. (bit 0 IS LSB)<br>bit 0: self_export. SELF OUTPUT FLAG (On:OUTPUT/Off:NON-OUTPUT)<br>   IN CASE OF NON-OUTPUT, VALUE OF rights count IN LICENSE OF Export SOURCE DRM DOES NOT CHANGE EVEN IF FLAG IS Exported.<br>   IN CASE OF OUTPUT, WHEN FLAG IS Exported, VALUE OF rights_count IN LICENSE OF Export SOURCE DRM IS SUBTRACTED BY THE NUMBER OF Export TIMES.<br>bit 1: export_ac. ACCESS CONDITION OUTPUT FLAG<br>    (On:OUTPUT/Off:NON-OUTPUT)<br>   EXPORT-AC. MEANINGS OF OUTPUT (On) AND NON-OUTPUT (Off) OF ACCESS CONDITION OUTPUT FLAG (On:OUTPUT/Off:NON-OUTPUT) ARE DEFINED BY EXPLANATION OF export_count.<br>   IN CASE OF OUTPUT (On), PlayInformation (DEFINED IN TABLE 11.15) TO WHICH acm OPTION IS ADDED MUST BE TRANSMITTED TO DECODER DRM FOR MEDIATING LICENSE TRANSFER TO DRM OF OTHER<br>bit 2: copy_kept_limit. LICENSE KEPT TIME LIMIT COPYING FLAG.<br>   On: LICENSE SUCH THAT LICENSE KEPT LIMIT IS COPIED FROM DISTRIBUTION SERVER OR VMDRM ONTO MEDIUM DRM IS ISSUED.<br>   Off: LICENSE KEPT TIME LIMIT IN INDIVIDUAL LICENSE TO BE ISSUED TO MEDIUM DRM IS OMITTED IN DISTRIBUTION SERVER OR VMDRM.<br>bit 3: copy_start_time. LICENSE START DATE AND HOUR COPYING FLAG.<br>   On: LICENSE SUCH THAT LICENSE START TIME LIMIT IS COPIED FROM DISTRIBUTION SERVER OR VMDRM ONTO MEDIUM DRM IS ISSUED.<br>   Off: LICENSE MUST NOT BE ISSUED TO OTHER MEDIA DRM IN THE DISTRIBUTION SERVER OR MEDIUM DRM UNTIL LICENSE START DATE AND HOUR.<br>bit 4: dynamic_license. DYNAMIC LICENSE DESIGNATION FLAG.<br>   On: RESTRICTED TO dynamic license. IN THE CASE WHERE THIS FLAG IS On IN THE LICENSE OF MEDIUM DRM OR DISTRIBUTION SERVER, DISTRIBUTION SERVER MUST DENY LICENSE WHEN OFFLINE LICENSE IS REQUIRED.<br>   Off: RESTRICTED TO offline LICENSE. ONLY offline LICENSE CAN BE ISSUED IN THE CASE WHERE THIS FLAG IS Off IN LICENSE OF DISTRIBUTION SERVER OR MEDIA DRM.<br>   WHEN LICENSE IS ISSUED, ACL IS INTERPRETED, AND AN INDIVIDUAL LICENSE IS GENERATED AND ISSUED. 01h MUST BE SET IN rights_count OF INDIVIDUAL LICENSE ISSUED AS SEQUENCE LICENSE. AT THAT TIME, 00h MUST BE SET IN MOVE COUNTER.<br>bit 5: decoder_cert. DECODER CERTIFICATE INDISPENSABLE FLAG.<br>   On: USE OF DECODER CERTIFICATE IS INDISPENSABLE LICENSE TRANSMISSION SIDE ENCRYPTS Kc AND Acp IN LICENSE USING PUBLIC KEY OF DECODER DRM CERTIFICATE AND ISSUES ENCRYPTED DATA TO RECEIVING SIDE. THEREFORE, CLIENT REQUESTING LICENSE DISTRIBUTION MUST TRANSMIT PUBLIC KEY CERTIFICATE OF DECODER DRM TO DISTRIBUTION SERVER OR MEDIUM DRM AT TIME OF Open. PART ENCRYPTED BY PUBLIC KEY OF DECODER DRM IS DECODER DRM.<br>   Off: USE OF DECODER CERTIFICATE IS NOT INDISPENSABLE. CLIENT NEED NOT TRANSMIT PUBLIC KEY CERTIFICATE OF DECODER DRM TO DISTRIBUTION SERVER OR MEDIUM DRM.<br>bit 6: Reserved. FLAG IS SET TO Off(0).<br>bit 7: deny. PREFERENTIAL DENY FLAG (On: DENY/Off LICENSE).<br>   IN CASE OF DENY (On), EVEN IF WHICHEVER LICENSE IS ASSIGNED TO USER OF LICENSE ISSUANCE SOURCE OR GROUP TO WHICH USER BELONGS, Operation DESIGNATED BY ACLEntry INCLUDING THIS FIELD IS PREFERENTIALLY DENIED. IN CASE OF ON, FIELDS OTHER THAN kept_limit ANDstart_time ARE INVALIDATED.<br>   THIS FLAG ALWAYS BECOMES Off IN FIELD OF GET-LICENSE.<br>IN CASE OF OMISSION, ALL FLAGS BECOME Off(0). |

FIG. 18

| | | |
|---|---|---|
| | rights_count | NUMBER OF RIGHTS. NUMBER OF TIMES BY WHICH COPYING CAN BE PERFORMED IS 1. NUMBER OF LICENSES THAT CAN BE DISTRIBUTED OR MOVED TO OTHER MEDIUM DRMS FROM DISTRIBUTION SERVER OR DISTRIBUTION DESTINATION MEDIUM DRM. |
| | Size | 1-BYTE FIXED |
| | Data | 00h TO FEh: EXPRESSION USING INTEGER NUMBER WITHOUT CODE. NUMBER OF LICENSES THAT CAN BE DISTRIBUTED AND MOVED FROM DISTRIBUTION SERVER, VMDRM AND MEDIUM DRM TO OTHER VMDRM OR MEDIUM DRM. IN DISTRIBUTION AND MOVEMENT SOURCE DRM, WHENEVER LICENSE IS DISTRIBUTED AND MOVED, VALUE OF THIS FIELD IS SUBTRACTED BY NUMBER OF DISTRIBUTION OR MOVEMENT TIMES. AT TIME OF 00h, LICENSE CANNOT BE DISTRIBUTED AND MOVED TO OTHER MEDIUM DRM AND LICENSE BECOMES INVALID AT DISTRIBUTION AND MOVEMENT SOURCE DRM.<br>FFh: THIS SHOWS THAT COPYING ONTO OTHER MEDIUM DRM CAN BE PERFORMED AN INFINITE NUMBER OF TIMES. VALUE DOES NOT CHANGE AFTER LICENSE IS DISTRIBUTED AND MOVED. |
| | kept_period | LICENSE RETENTION PERIOD. PERIOD WHILE LICENSE RECORDED IN DISTRIBUTION DESTINATION DRM CAN BE KEPT |
| | Size | 4-BYTE FIXED |
| | Data | THIS IS INTERPRETED AS EXPRESSION USING INTEGER NUMBER WITHOUT CODE. THIS IS INTERPRETED AS "INFINITE" IF THIS FIELD IS OMITTED. |
| | kept_limit | LICENSE RETENTION TIME LIMIT. |
| | Size | VARIABLE LENGTH |
| | Data | DateAndTime STRUCTURE<br>IN CASE WHERE THIS FIELD IS DESIGNATED IN LICENSE OF DATABASE OF DISTRIBUTION SERVER, LICENSE DISTRIBUTION MUST BE STOPPED AFTER DESIGNATED TIME LIMIT.<br>IN CASE WHERE INVALID VALUE IS SET, LICENSE IS MADE INVALID. IN CASE WHERE DESIGNATION IS MADE TOGETHER WITH kept_period, SIDE WHERE TIMEOUT IS EARLIER THAN OTHER SIDE HAS EFFECTIVE POWER.<br>OMISSION VALUE MEANS "INFINITE". |
| | start_time | LICENSE START DATE AND HOUR. |
| | Size | VARIABLE-LENGTH |
| | Data | DateAndTime STRUCTURE.<br>IN CASE WHERE THIS FIELD IS DESIGNATED IN LICENSE OF DATABASE OF DISTRIBUTION SERVER OR VMDRM, LICENSE MUST NOT BE DISTRIBUTED BEFORE DESIGNATED TIME ELAPSES. IN CASE WHERE THIS FIELD IS DESIGNATED IN LICENSE OF MEDIUM DRM, LICENSE IS INVALIDATED UNTIL DESIGNATED TIME, AND GRANTING OF LICENSE TO DECODER DRM AND MOVING AND COPYING OF LICENSE ONTO MEDIUM DRM MUST BE STOPPED.<br>OMISSION VALUE MEANS "IMMEDIATE LICENSE". |
| | subject_list | LICENSE SUBJECT DOMAIN LIST |
| | Size | VARIABLE LENGTH |
| | Data | SubjectList STRUCTURE<br>THIS LIST SHOWS LIST OF ANTECEDENCE RDNS OF CERTIFICATE SUBJECT NAMES OF DRM TO WHICH LICENSE IS GRANTED. ISSUANCE OF THIS LICENSE IS GRANTED TO ONLY DRM HAVING CERTIFICATE OF SUBJECT NAME (DN) HAVING ANTECEDENCE RDN DESIGNATED IN THIS LIST. |

FIG. 19

| Bit | MEANING | AUTHENTICATION METHOD CONDITION LIST OF ACL Entry THAT DOES NOT SATISFY (1) TO (6) | AUTHENTICATION METHOD CONDITION LIST OBTAINED BY checkPrincipal | RESULT |
|---|---|---|---|---|
| 0 | ID/PASSWORD | 1 | 1 | 1 |
| 1 | PKI AUTHENTICATION USING IC CARD | 1 | 0 | 0 |
| 2 | :FINGER PRINT AUTHENTICATION | 0 | 1 | 1 |
| 3 | SIGNATURE (HANDWRITING) AUTHENTICATION | 0 | 0 | 1 |
| 4 | VEIN AUTHENTICATION | 0 | 0 | 1 |
| 5 | FACE AUTHENTICATION | 0 | 0 | 1 |
| 6 | RETINA AUTHENTICATION | 0 | 0 | 1 |
| 7 | VOICEPRINT AUTHENTICATION | 0 | 0 | 1 |

FIG. 21

| ORDER | LICENSE CONDITION | | SELECTION RULE |
|---|---|---|---|
| 1 | acm | kept_limit | SELECTING SHORTEST ACL Entry |
| 2 | acm | operation_count | SELECTING ACL Entry WITH MINIMUM VALUE |
| 3 | acm | kept_period | SELECTING SHORTEST ACL Entry |
| 4 | acp | PARTIALLY COPYING PROHIBITION flags | SELECTING ACL Entry WHEN FLAG IS On * |
| 5 | acp | STORING PROHIBITION flags | SELECTING ACL Entry WHEN FLAG IS On * |
| 6 | acp | PRINTING PROHIBITION flags | SELECTING ACL Entry WHEN FLAG IS On * |
| 7 | acm | rights_count | SELECTING ACL Entry WITH MINIMUM VALUE |

F I G. 2 2

| DecodeInformation STRUCTURE | | | Kc, ENCRYPTED LicenseInfo FOR DECODER DRM AND SELECTION OF THESE ARRAYS |
|---|---|---|---|
| Size | | | VARIABLE LENGTH |
| Data | | | SEQUENCE TYPE |
| | symmetric_key | | Kc. CONTENT DECODING KEY |
| | | Size | VARIABLE LENGTH |
| | | Data | SymmetricKey TYPE |
| | encrypted_play_info | | LicenseInfo ENCRYPTED USING PUBLIC KEY OF DECODER DRM CERTIFICATE |
| | | Size | VARIABLE LENGTH |
| | | Data | EncryptedCode TYPE<br><br>DATA OF LicenseInfo IS ENCRYPTED AND STORED USING PUBLIC KEY OF DECODER DRM CERTIFICATE |
| | decode_info_sequence | | LIST HAVING RANK ORDER OF CONTENT DECODING INFORMATION SUCH AS Kc |
| | | Size | VARIABLE LENGTH |
| | | Data | SEQUENCE OF DecodeInformation TYPE. HOWEVER, decode_info_sequence FIELD MUST NOT BE INCLUDED IN THIS FIELD. |
| | element-key-map | | LIST OF CORRESPONDING ELEMENT OF ENCRYPTED CONTENT TO DECODING KEY |
| | | Size | VARIABLE LENGTH |
| | | Data | ElemetKeyMap TYPE<br><br>NUMBER OF ENCRYPTED CONTENT ELEMENT CORRESPONDING TO EACH Kc.<br>CONTENT IS OBTAINED BY LISTING ENCRYPTED CONTENT ELEMENT NUMBERS TO WHICH DECODING IS GRANTED USING CORRESPONDING DecodeInformation.<br>EACH Kc IN decode_info_sequence CORRESPONDS TO ELEMENT NUMBER HAVING SAME RANK ORDER IN THIS FIELD.<br>IN CASE WHERE THIS FIELD EXISTS, ELEMENT THAT DOES NOT EXIST IN THIS NUMBER LIST MUST NOT BE DECODED USING TARGET DecodeInformation.<br>THIS FIELD EXISTS ONLY IN DecodeInformation IN WHICH decode_info_sequence FIELD IS SELECTED. |

F I G. 3 0

| ElementKeyMap TYPE | | | LIST OF CORRESPONDING ENCRYPTED CONTENT ELEMENT TO DECODING KEY |
|---|---|---|---|
| | Size | | VARIABLE LENGTH |
| | Data | | CONTENT DECODING KEY OR LICENSE INFORMATION CORRESPONDING TO EACH ENCRYPTED CONTENT ELEMENT NUMBER IS SHOWN.<br>THAT IS, ENCRYPTED CONTENT ELEMENT NUMBER AND INFORMATION NECESSARY FOR DECODING ELEMENT THEREOF ARE STORED.<br>IN CASE WHERE THIS FIELD EXISTS, ELEMENTS THAT DO NOT EXIST IN ELEMENT NUMBER LIST THEREOF MUST NOT BE DECODED USING LICENSE IN WHICH FIELD THEREOF EXISTS. |
| | | element-number | ENCRYPTED CONTENT ELEMENTS NUMBER |
| | | Size | FOUR BYTES |
| | | Data | ENCRYPTED CONTENT ELEMENT NUMBER CORRESPONDING TO CONTENT DECODING KEY DESIGNATED BY NEXT FIELD OR LICENSE INFORMATION. THAT IS, ENCRYPTED CONTENT ELEMENT NUMBER THAT CAN BE DECODED BY CORRESPONDING DecodeInformation.<br>(NUMBER CORRESPONDING TO Element Number OF ENCRYPTED CONTENT) |
| | | decode_info | DECODING INFORMATION SUCH AS KEY FOR DECODING CONTENT |
| | | Size | VARIABLE LENGTH |
| | | Data | VALUE OF DecodeInformation CORRESPONDING TO ENCRYPTED CONTENT ELEMENT DESIGNATED BY PREVIOUS FIELD IS SHOWN.<br>HOWEVER, decode_info FIELD MUST NOT BE INCLUDED IN THIS FIELD. |
| | | | REPETITION WITH TWO OR MORE FIELDS AS SET |

F I G. 3 1

| Content Header | Element1 | Element2 | · · · | ElementN |

FIG. 32

| Data | Summary |
|---|---|
| Size of Content Information | Content Data Information SIZE |
| Size of Content ID | Content ID SIZE |
| Content ID | CONTENT ID |
| Size of Content Data | CONTENT DATA SIZE (byte) |
| Number of Elements | TOTAL NUMBER OF CONSTITUENT ELEMENTS |

FIG. 34

| Data | Summary |
|---|---|
| Element Number | ELEMENT IDENTIFICATION NUMBER<br>UNIQUE NUMBER ASSIGNED TO EACH ELEMENT |
| Start Offset of Element | START OFFSET (byte) OF Element WITH HEAD OF DATA AS STANDARD |
| Size of Element | ELEMENT SIZE |
| Element Type | ELEMENT TYPE |
| Cryptosystem | ENCRYPTION METHOD OF CONTENT |
| Key Length | KEY LENGTH (bit) OF CONTENT KEY |
| Size of Block | SIZE IS INDICATED USING NUMBER OF BYTES. |
| Size of Original Data | SIZE (byte) OF ORIGINAL DATA<br>ONLY DATA SIZE INCLUDING NEITHER BLOCK HEADER NOR PADDING |
| Start Offset of Attribute | START OFFSET OF Element Attribute WITH HEAD OF DATA AS STANDARD |
| Size of Attribute | SIZE OF Element Attribute |
| Character Code Set | CHARACTER CODE SET OF File Name |
| Size of File Name | SIZE OF FOLLOWING FILE NAME |
| File Name | FILE NAME ASSIGNED TO ELEMENT |

FIG. 35

| Bit | METHOD |
|---|---|
| Bit 0 | ID/PASSWORD METHOD |
| Bit 1 | PKI AUTHENTICATION METHOD USING IC CARD |
| Bit 2 | FINGERPRINT AUTHENTICATION METHOD |
| Bit 3 | SIGNATURE METHOD |
| Bit 4 | VEIN AUTHENTICATION METHOD |
| Bit 5 | FACE AUTHENTICATION METHOD |
| Bit 6 | RETINA AUTHENTICATION METHOD |
| Bit 7 | VOICEPRINT AUTHENTICATION METHOD |

FIG. 36

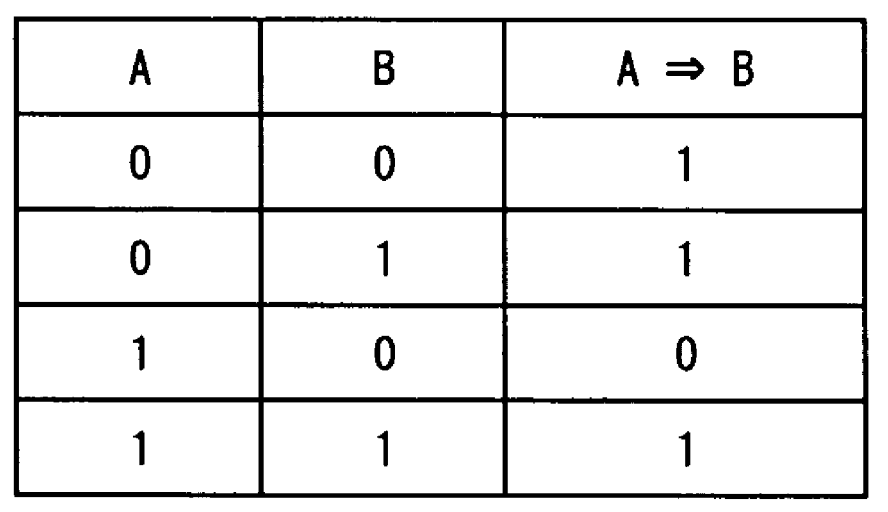

| A | B | A ⇒ B |
|---|---|---|
| 0 | 0 | 1 |
| 0 | 1 | 1 |
| 1 | 0 | 0 |
| 1 | 1 | 1 |

FIG. 37

| Bit | MEANING | INFORMATION OBTAINED BY MAPPING AUTHENTICATION METHOD CONDITION OBTAINED FROM USER MANAGEMENT SERVER ONTO FORMAT OF authentication_list | authentication_list | RESULT |
|---|---|---|---|---|
| 0 | ID/PASSWORD | 1 | 1 | 1 |
| 1 | PKI AUTHENTICATION USING IC CARD | 0 | 1 | ☐0 |
| 2 | FINGERPRINT AUTHENTICATION | 1 | 0 | 1 |
| 3 | SIGNATURE (HANDWRITING) AUTHENTICATION | 0 | 0 | 1 |
| 4 | VEIN AUTHENTICATION | 0 | 0 | 1 |
| 5 | FACE AUTHENTICATION | 0 | 0 | 1 |
| 6 | RETINA AUTHENTICATION | 0 | 0 | 1 |
| 7 | VOICEPRINT AUTHENTICATION | 0 | 0 | 1 |

FIG. 38

| RightsScriptSpec STRUCTURE | | | AUTHORITY DESCRIPTION SPECIFICATION DESIGNATION INFORMATION |
|---|---|---|---|
| Size | | | VARIABLE LENGTH |
| Data | | | SEQUENCE TYPE |
| | | | OBJECT IDENTIFIER TYPE |
| | script_id | | OBJECT IDENTIFIER OF AUTHORITY DESCRIPTION METHOD |
| | | Size | VARIABLE LENGTH |
| | | Data | OBJECT IDENTIFIER TYPE |
| | | | ID INDICATING AUTHORITY DESCRIPTION LANGUAGE AND INTERPRETATION POLICY THEREOF |
| | | | INTERPRETATION OF OMITTED VALUE DEPENDS ON MOUNTED SYSTEM. |

FIG. 39

| ORDER | LICENSE CONDITION | | SELECTION RULE |
|---|---|---|---|
| 1 | acm | operation_count | SELECTING ACL Entry WITH MINIMUM VALUE |
| 2 | acp | PARTIALLY COPYING PROHIBITION flags | SELECTING ACL Entry WHEN FLAG IS On* |
| 3 | acp | STORING PROHIBITION flags | SELECTING ACL Entry WHEN FLAG IS On* |
| 4 | acm | kept_limit | SELECTING SHORTEST ACL Entry |
| 5 | acm | kept_period | SELECTING SHORTEST ACL Entry |
| 6 | acp | COPYING PROHIBITION flags | SELECTING ACL Entry WHEN FLAG IS On* |
| 7 | acm | rights_count | SELECTING ACL Entry WITH MINIMUM VALUE |

F I G. 4 0

| ORDER | LICENSE CONDITION | | SELECTION RULE |
|---|---|---|---|
| 1 | acm | operation_count | SELECTING ACL Entry WITH MAXIMUM VALUE |
| 2 | acp | PARTIALLY COPYING PROHIBITION flags | SELECTING ACL Entry WHEN FLAG IS Off* |
| 3 | acp | STORING PROHIBITION flags | SELECTING ACL Entry WHEN FLAG IS On* |
| 4 | acm | kept_limit | SELECTING LONGEST ACL Entry |
| 5 | acm | kept_period | SELECTING SHORTEST ACL Entry |
| 6 | acp | PRINTING PROHIBITION flags | SELECTING ACL Entry WHEN FLAG IS On* |
| 7 | acm | rights_count | SELECTING ACL Entry WITH MINIMUM VALUE |

F I G. 4 1

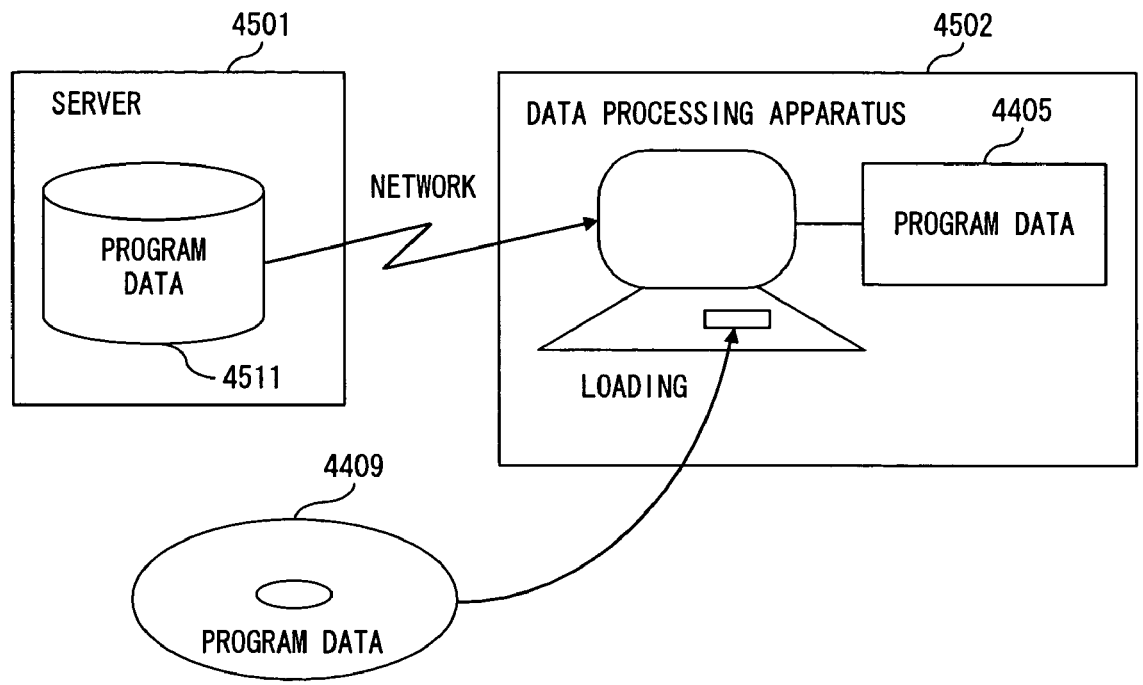
F I G. 4 5

DATA PROCESSING APPARATUS FOR DIGITAL COPYRIGHTS MANAGEMENT

BACKGROUND OF THE INVENTION

Field of the Invention

The present invention relates to technology for managing operations from registration to distribution of digital content of an electronic confidential document, etc and controlling operations such as inspection, preservation, edition, copies, etc. of the distributed content. Specifically, it relates to a data processing apparatus for securely managing digital content using Digital Rights Management (DRM) technology.

DRM technology for dealing with the problem of copyright protection of digital content on the Internet is known. Generally, DRM technology protects digital content, permits its distribution and then manages the digital content. The DRM technology that is used in this specification indicates the following:

Content is encrypted. Then, a license condition for the content and a decoding key of the content are stored in a license.

When a user uses the content, he or she downloads the encrypted content from a content server, downloads a license from a license distribution server and then uses the content in accordance with a license condition of the license.

When an electronic document is managed using a DRM technology, the distribution control of a license and the mechanism of generating an individual license for each user are described in "Confidential Content Management Method" (Japanese patent application 2003-095723) that is a senior application.

In the technical paper (refer to nonpatent literature 1) disclosing a UDAC (Universal Distribution with Access Control) that is a system of the DRM technology in which an inventor of the present invention is involved, the application cases, etc. of the UDAC to music content are described. [Nonpatent literature 1] Takeaki Anazawa, Hiroshi Takemura, Takashi Tsunehiro, Takayuki Hasebe and Takahisa Hatakeyama, "Open Superdistribution Infrastructure Realizing the Tenacity of the Content Protection" [online], report of study session of Information Processing Society of Japan, EIP14-5, November 2001, [Retrieved on Feb. 4, 2004], Internet<URL: http://www.keitaide-music.org/pdf/EIP14-5.pdf>

However, there are the following problems in the above-mentioned conventional content management method.

(1) In the content management system using a DRM, when a license is distributed, a public key certificate prepared based on a Public Key Infrastructure (PKI) is used for the communications between a client and a server. Certificate Authority (CA) should be introduced for the management/operation of the public key certificate. A system that requires the maintenance of high security strength should change a client module into a Tamper Resistant Module (TRM) for each security domain of a client utilizing a strict certificate authority. At present, however, there are many requests for operating a DRM readily and cheaply using a simple certificate authority even if the security strength decreases to some extent.

A system development party changes a client module into a TRM under the condition that a class public key certificate and a private key corresponding to this certificate are embedded in the client module beforehand and then ships this module. In the case where a class public key certificate becomes vulnerable in this structure, a System Development Corporation must reproduce the client module again and a user also must install the client module again.

(2) A license to be distributed to each user is individually generated by enabling a license distribution server to refer to an Access Control List (ACL). A license is set up in units of groups or users. Specifically, license conditions are set up in such a way that the printing of content is permitted in group A while the printing of content is prohibited in group B, etc. Since any user can belong to one or more groups under this circumstance, it is necessary to decide under which license condition distributed to the user should be applied for a license.

(3) A control of transmitting a license that is downloaded into a client terminal to another restricted client terminal is not materialized.

(4) As shown in FIG. 1, an operation log 13 that shows what kind of operation is performed in a client terminal 11 for the content to be protected is managed by the client terminal 11. Then, the operation log is transmitted to a log management server 12 at the right time and the transmitted log is managed as log data 14. However, an alteration can be easily made when the log is managed on a client side. Furthermore, it costs a lot when taking an alternation prevention process, etc. so that this process is difficult to carry out.

(5) A license distribution server can distribute only one license condition for one content regarding one license request. Therefore, a client terminal must make the license requests for a license distribution server on a plurality of occasions when a plurality of contents is used.

(6) When a license is acquired by the client terminal, there is no mechanism for informing a license distribution server about whether or not the terminal is certified by the content protection system using a DRM. Therefore, a license may be distributed even to a non-certified client terminal.

(7) In the case where the client terminal receives a license that stores a plurality of license conditions for the same content, there is no method of selecting one license condition from the plurality of conditions. Therefore, the received license cannot be utilized.

(8) When the content that is protected using a DRM is edited, the data can be stolen from a common memory (clipboard) by cutting, copying and pasting, etc. the data in the content.

SUMMARY OF THE INVENTION

A first subject of the present invention is to offer a data processing apparatus that can simply control and operate a public key certificate without the reproduction and reinstallation of a client module in the case where a public key certificate becomes vulnerable.

The second subject of the present invention is to offer a data processing apparatus for materializing content management using an improved DRM.

A first data processing apparatus of the present invention comprises a storage device, a generation device and a transmission device. The data processing apparatus distributes to a user terminal a terminal module that is a program for obtaining license data used for decoding an encrypted digital content using a public key infrastructure. The storage device stores an encryption key. The generation device encrypts, using the encryption key, a public key certificate necessary for encrypted communication based on the public key infrastructure and the information about a private key for the public key of the public key certificate and generates encryption information. The transmission device includes a decoding key for decoding the encryption information and decoding the encryption information after being activated on the user terminal, thereby transmitting a terminal module for obtaining both the public key certificate and the information about a private key and the encryption information to the user terminal.

The second data processing apparatus of the present invention comprises a storage device, a generation device and a transmission device. The apparatus receives an access request for digital content from a user terminal and distributes license data used for accessing the digital content to the user terminal as a response. The storage device stores a plurality of access control lists in which a user with access permission, a permitted access pattern and license conditions are described while corresponding to the digital content. The generation device obtains an access control list corresponding to a content identifier included in the access request and also corresponding to a user identifier of an applicant who transmits the access request, from the plurality of access control lists. If there a plurality of access control lists is obtained, the generation device selects one access control list from the plurality of obtained access control lists and generates individual license data based on the selected access control list. The transmission device transmits the individual license data to the user terminal.

The third data processing apparatus of the present invention comprises a storage device and a selection device. The apparatus transmits an access request for a digital content to a license distribution apparatus and receives license data for accessing the digital content as a response from the license distribution apparatus. The storage device includes a plurality of access control lists in which both an access pattern permitted for the digital content and license conditions are described and information designating a selection processing. Further, the device stores the license data received from the license distribution apparatus. The selection device implements a selection processing designated by the license data and selects one access control list from the plurality of access control lists.

DETAILED EXPLANATION OF THE DRAWINGS

Figure 2A:
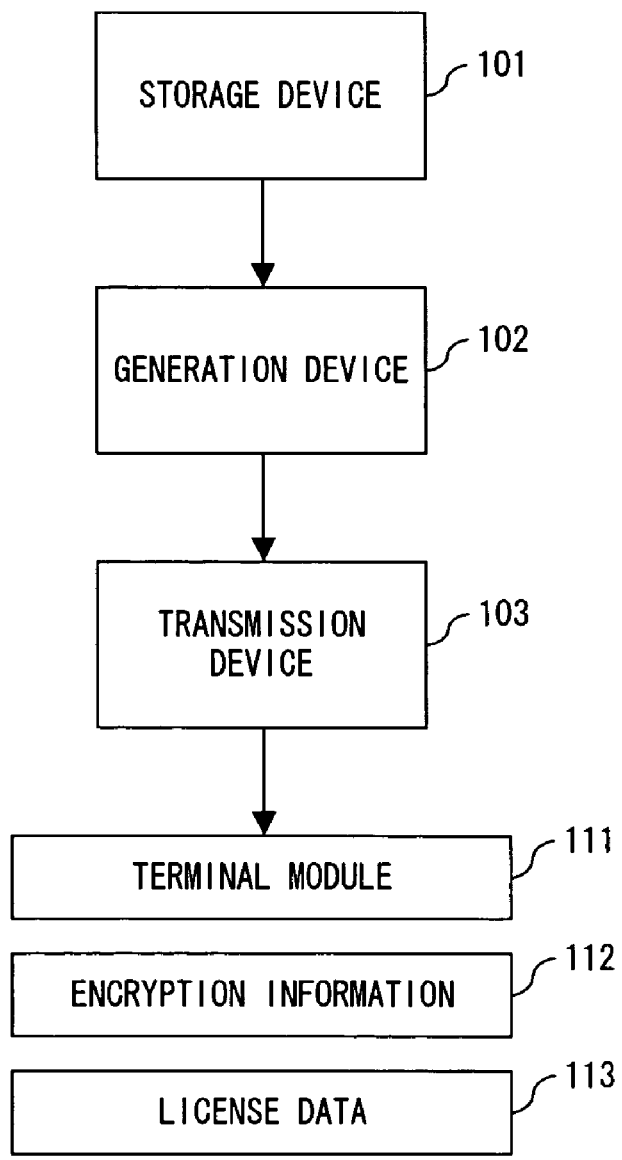
Figure 2B:
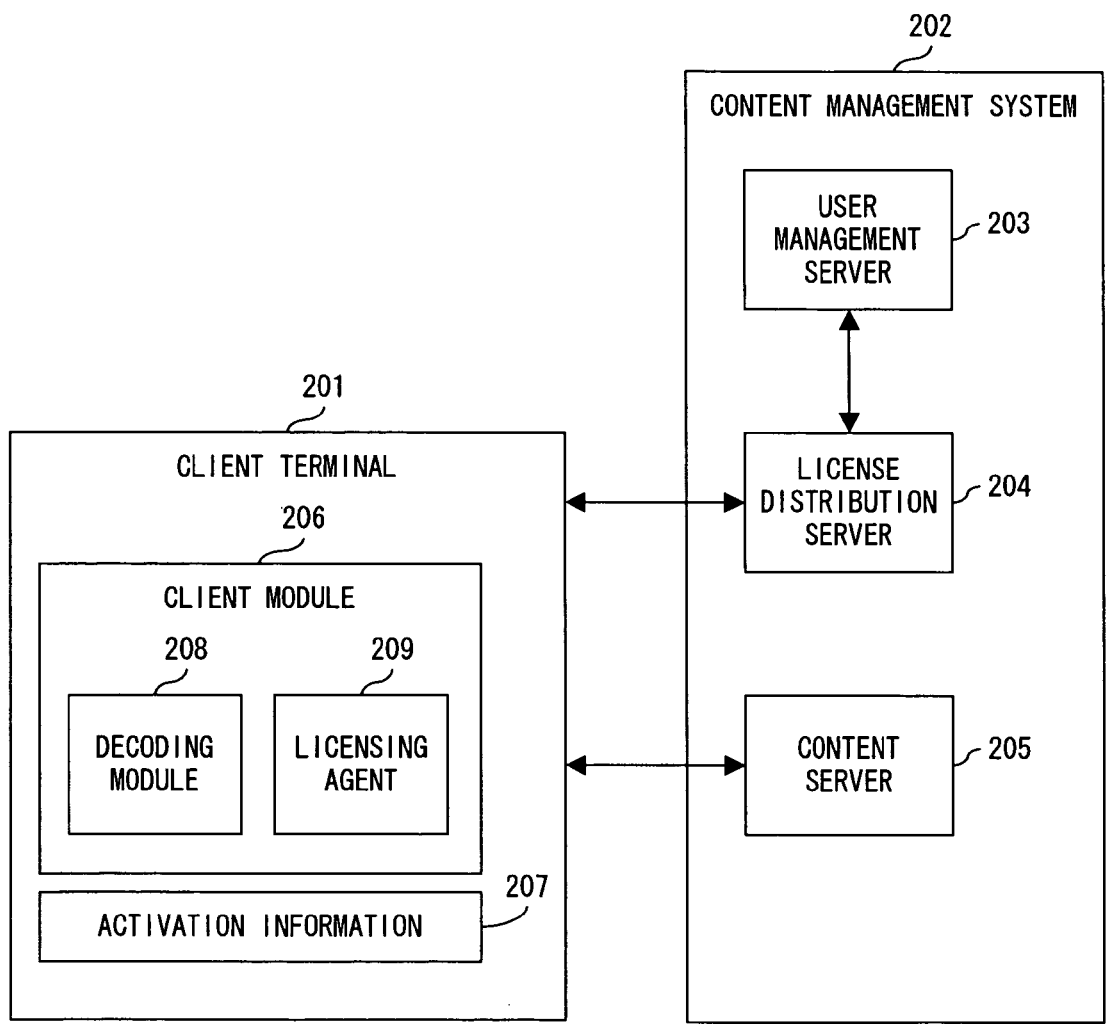
Figure 3:
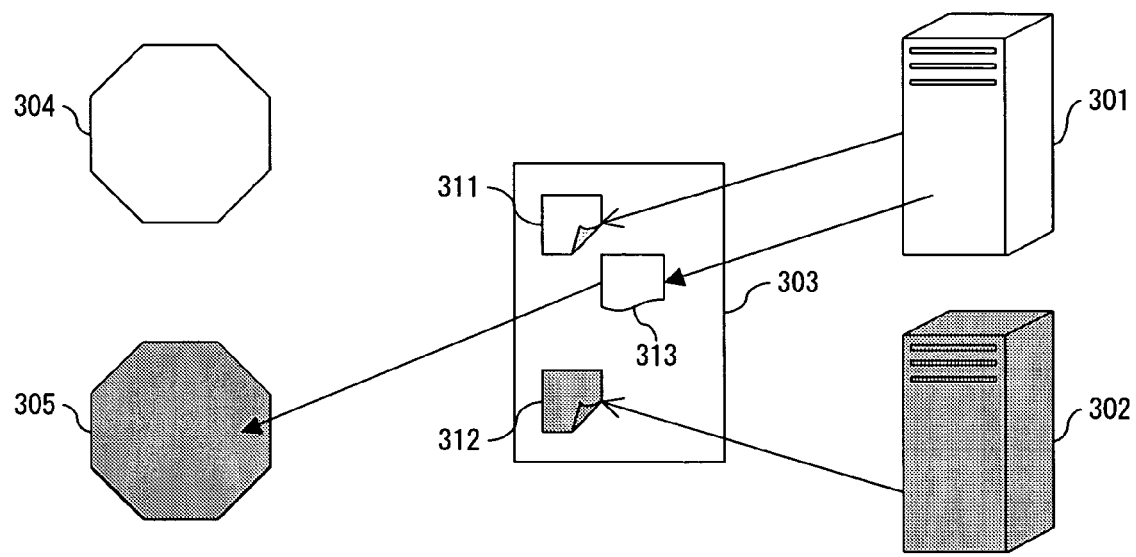
Figure 5:
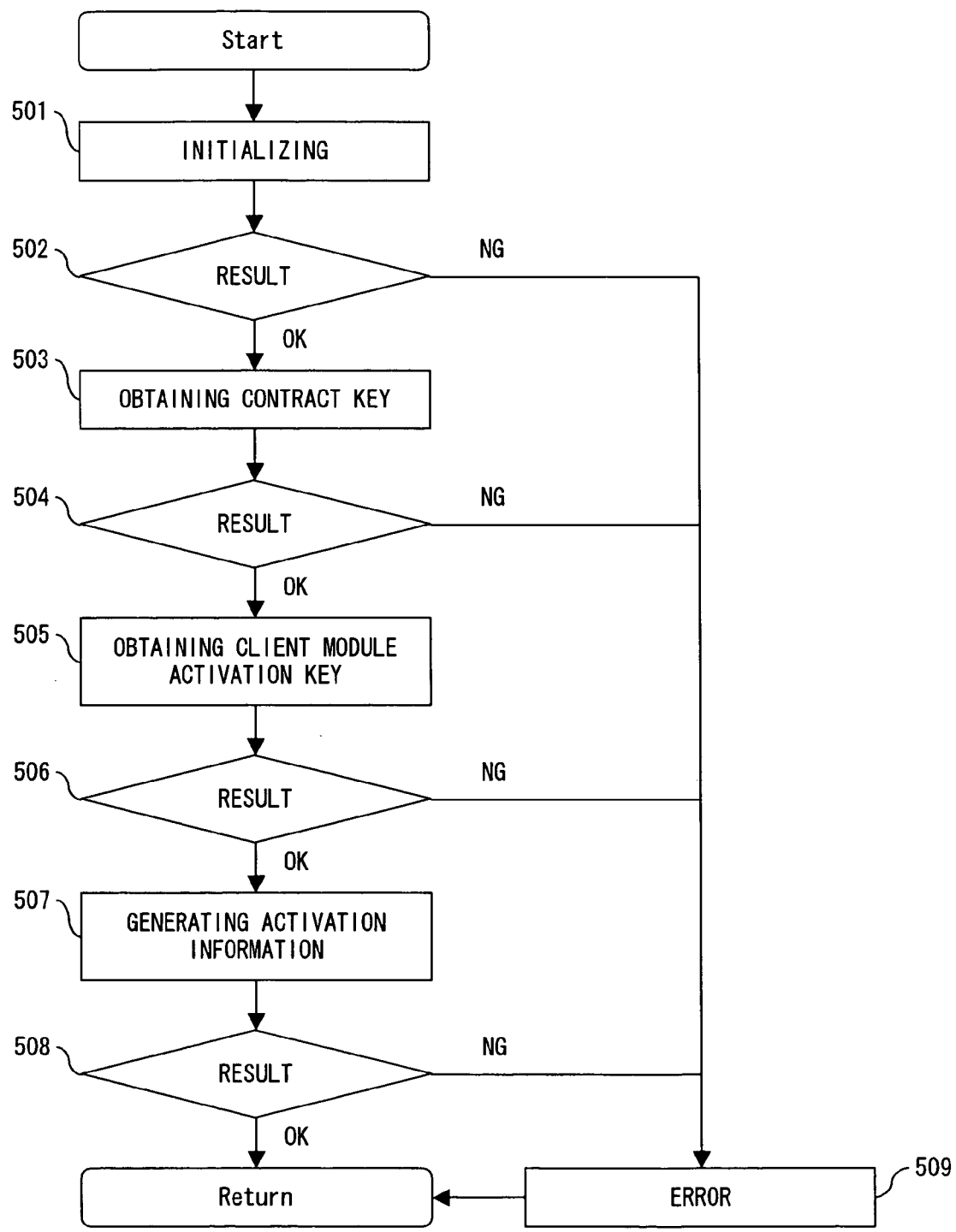
Figure 6:
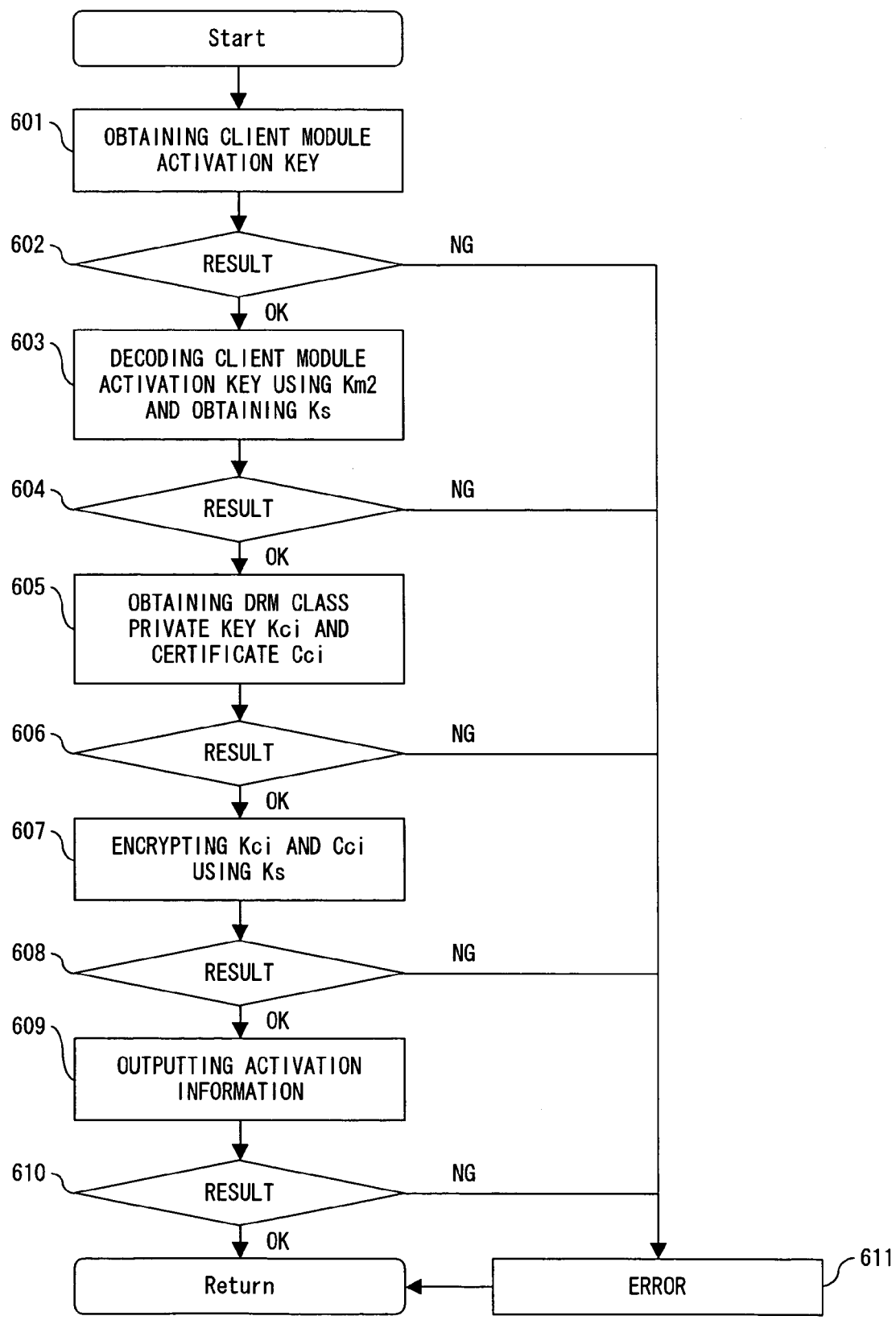
Figure 20:
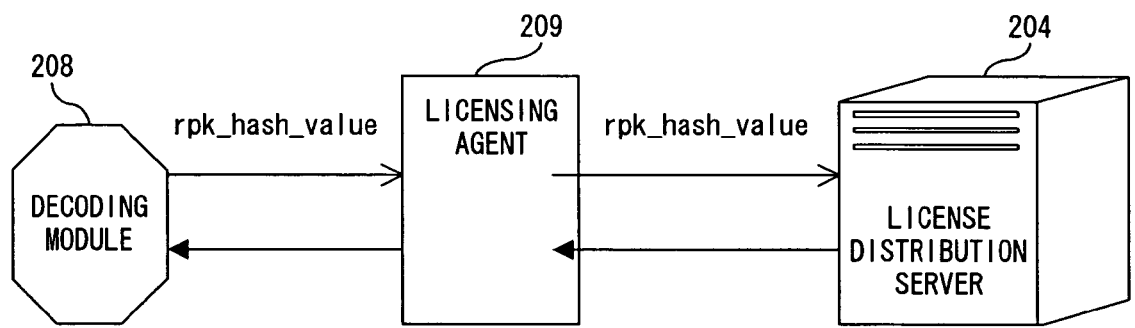
Figure 23:
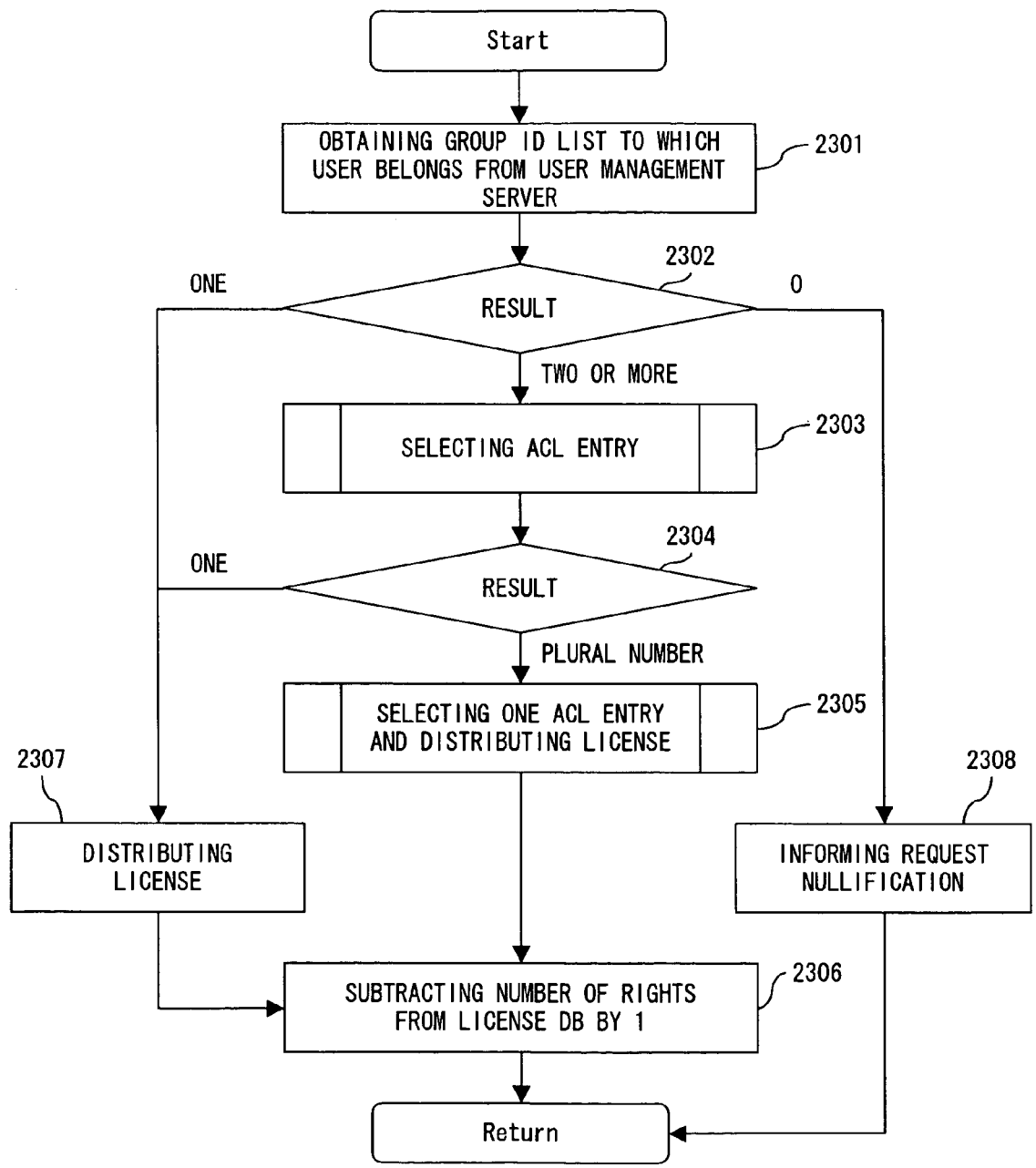
Figure 24:
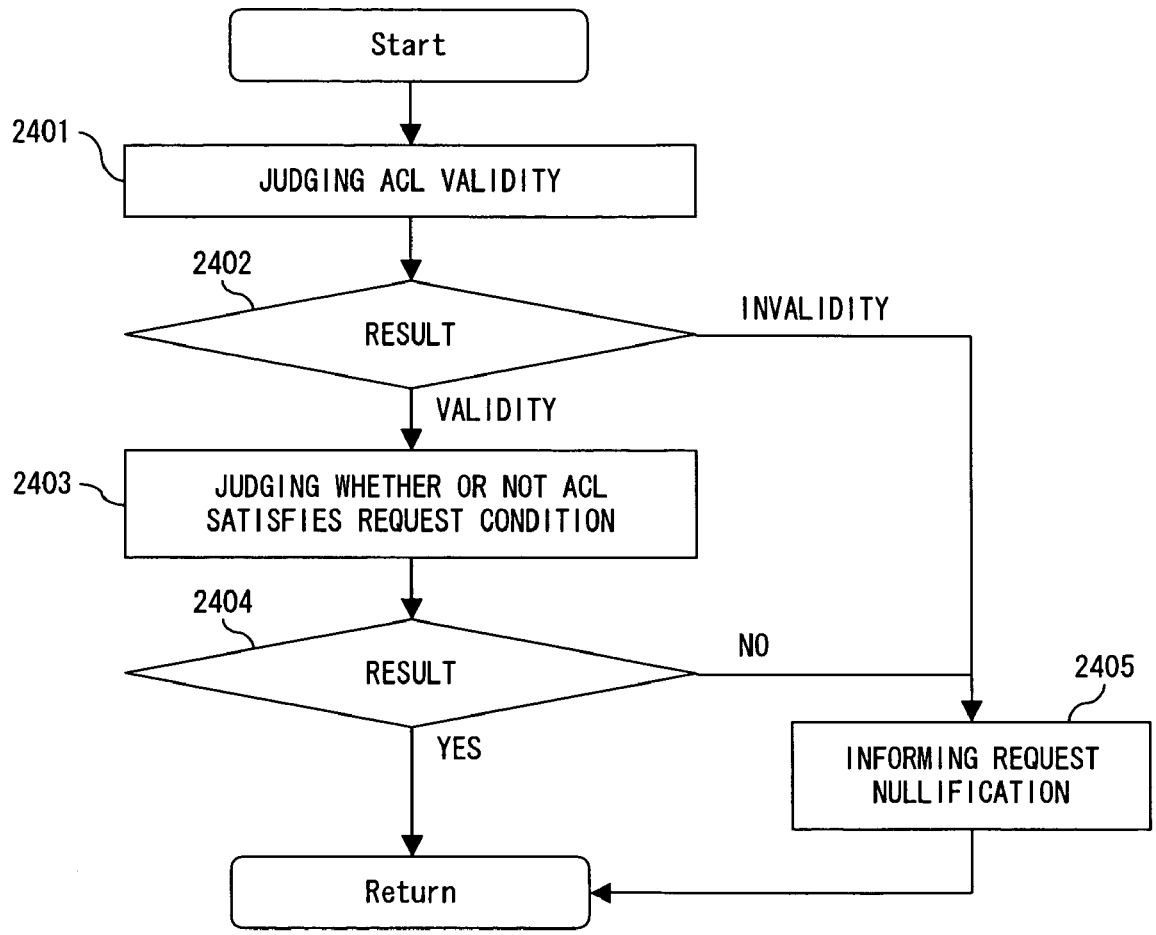
Figure 25:
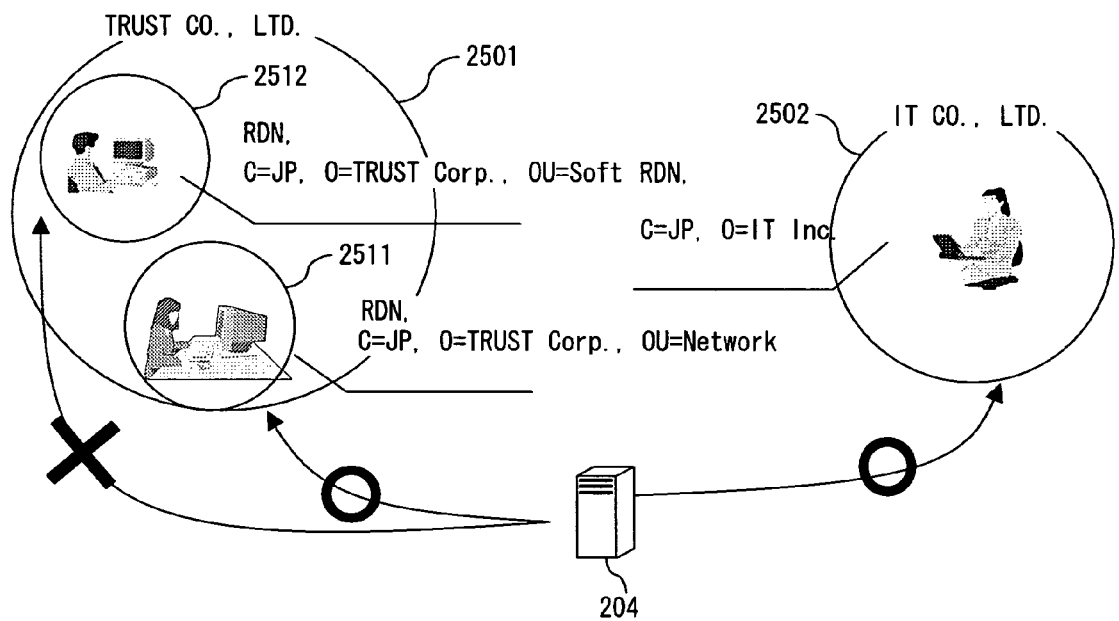
Figure 26:
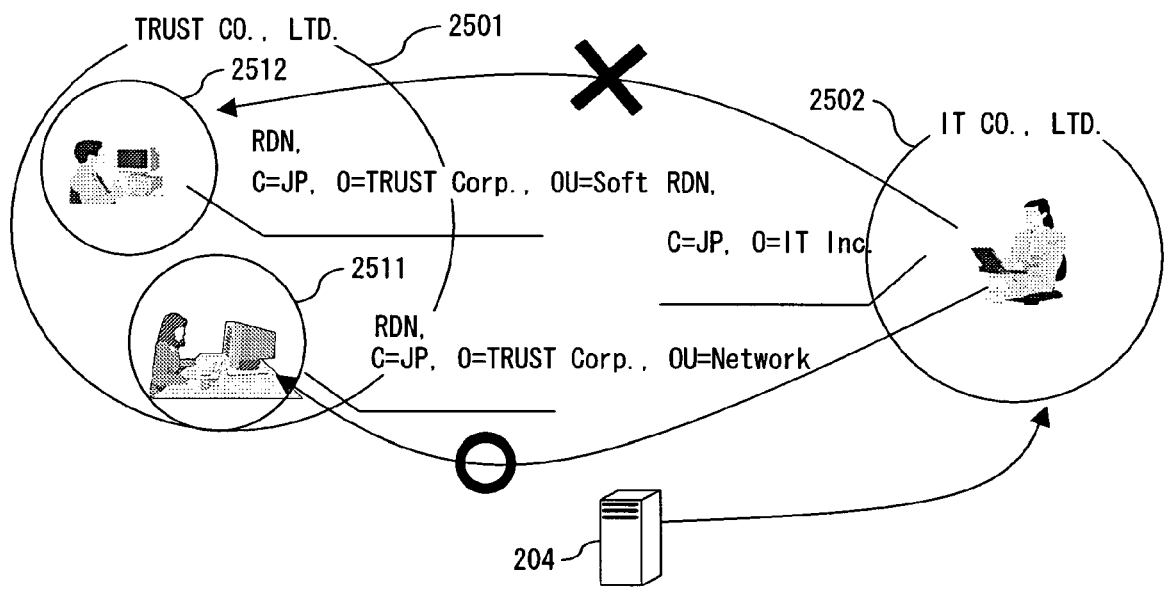
Figure 27:
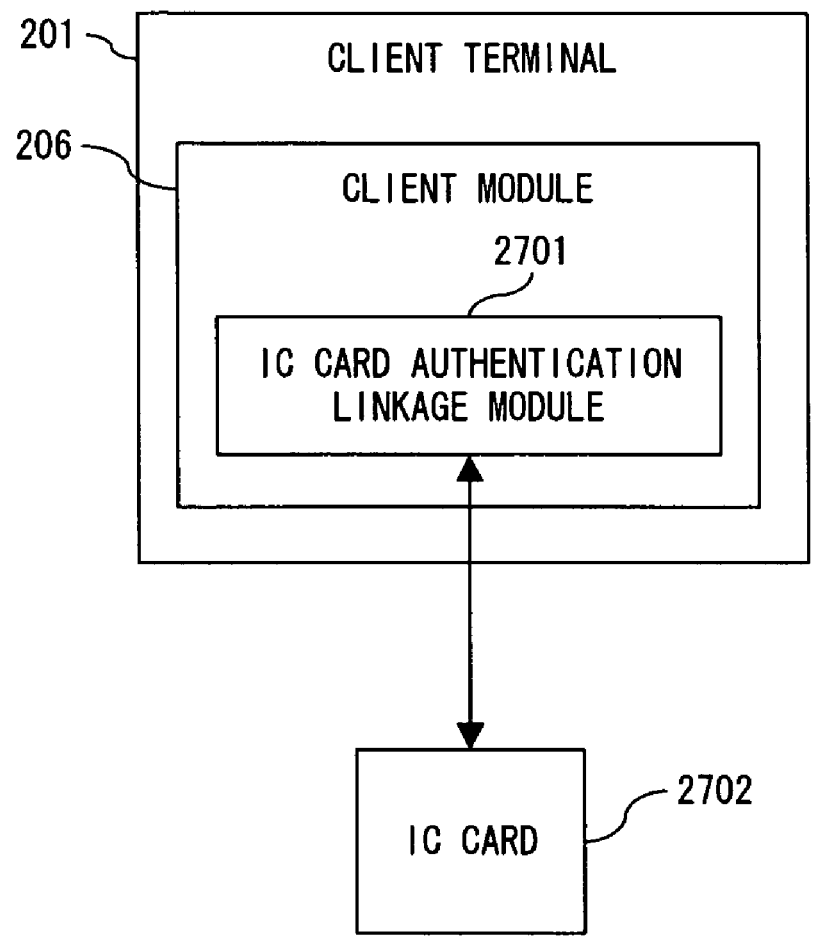
Figure 28:
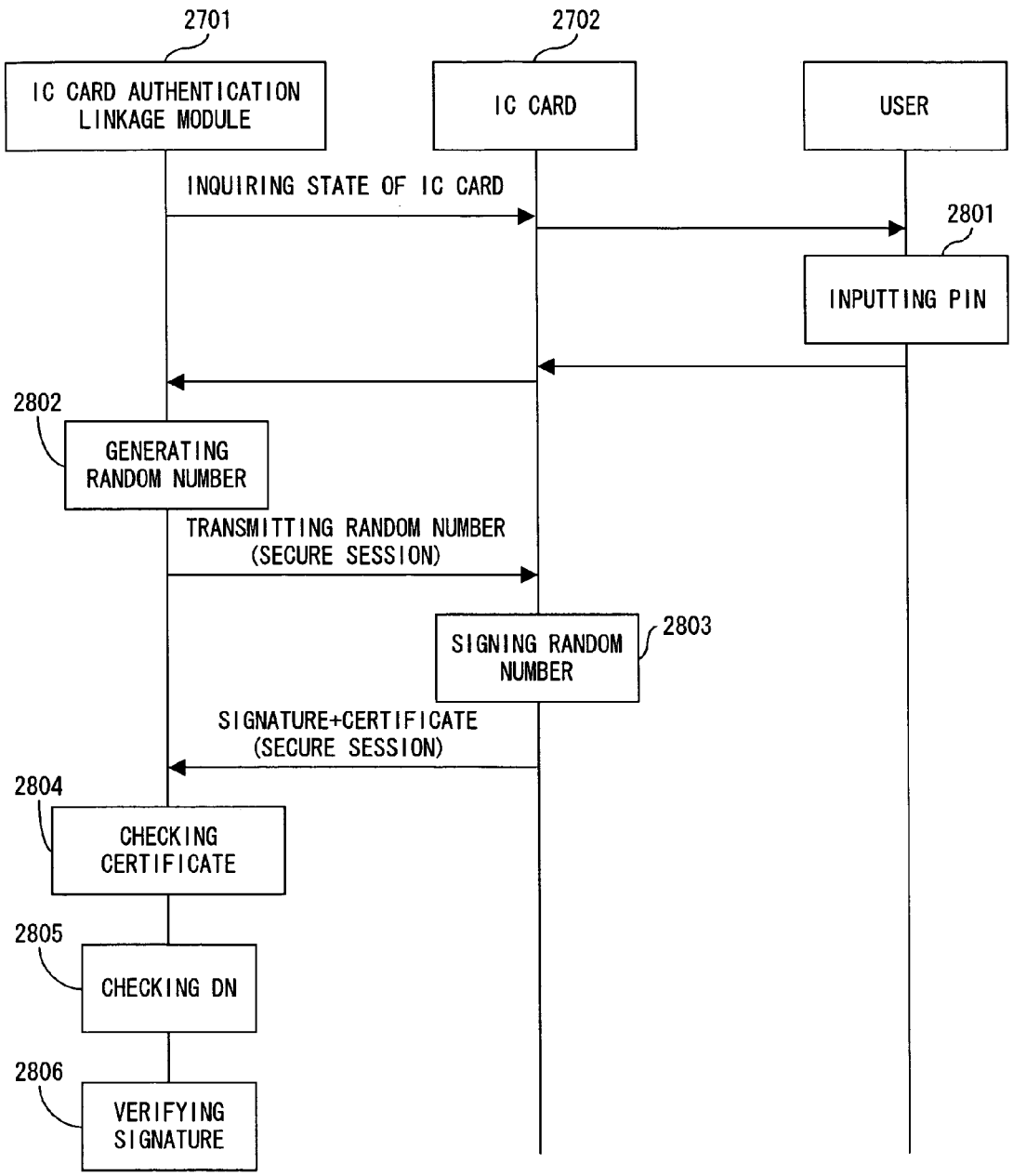
Figure 29:
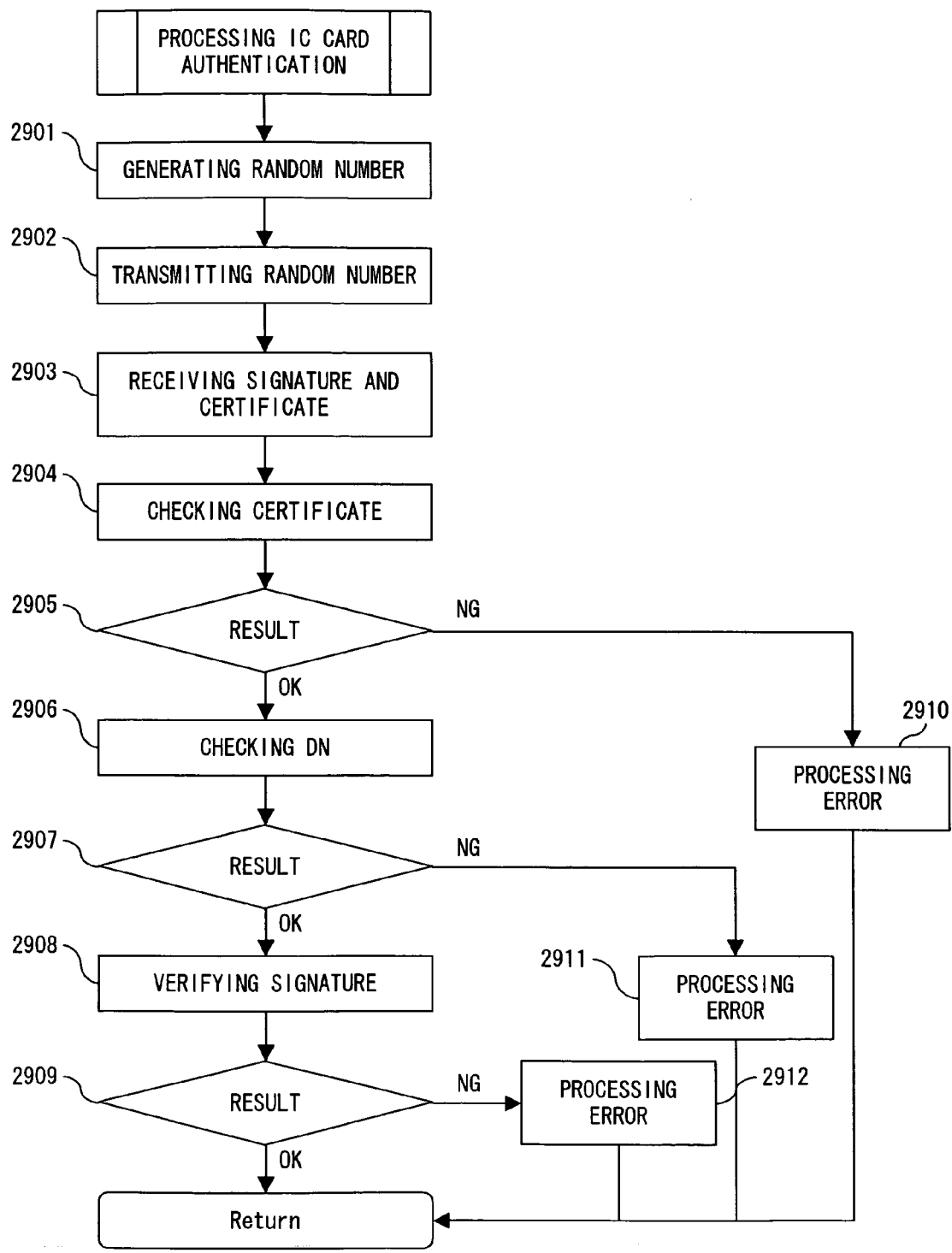
Figure 33:
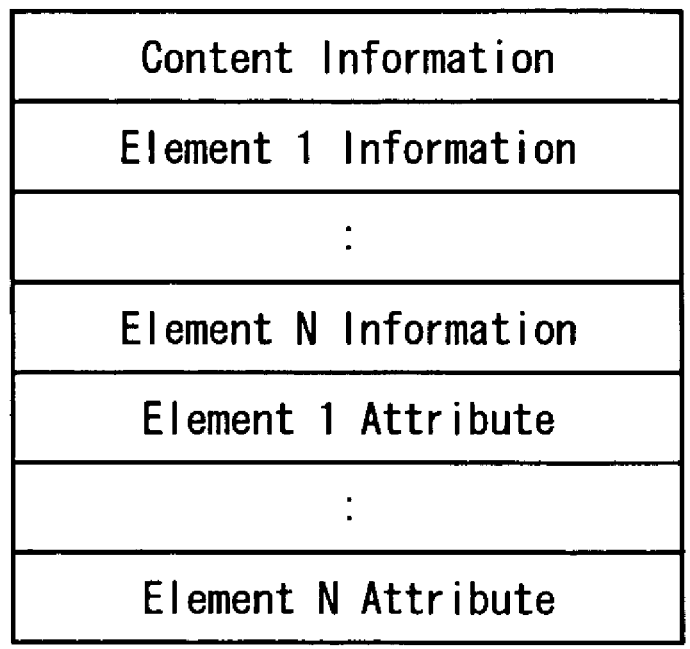
Figure 42:
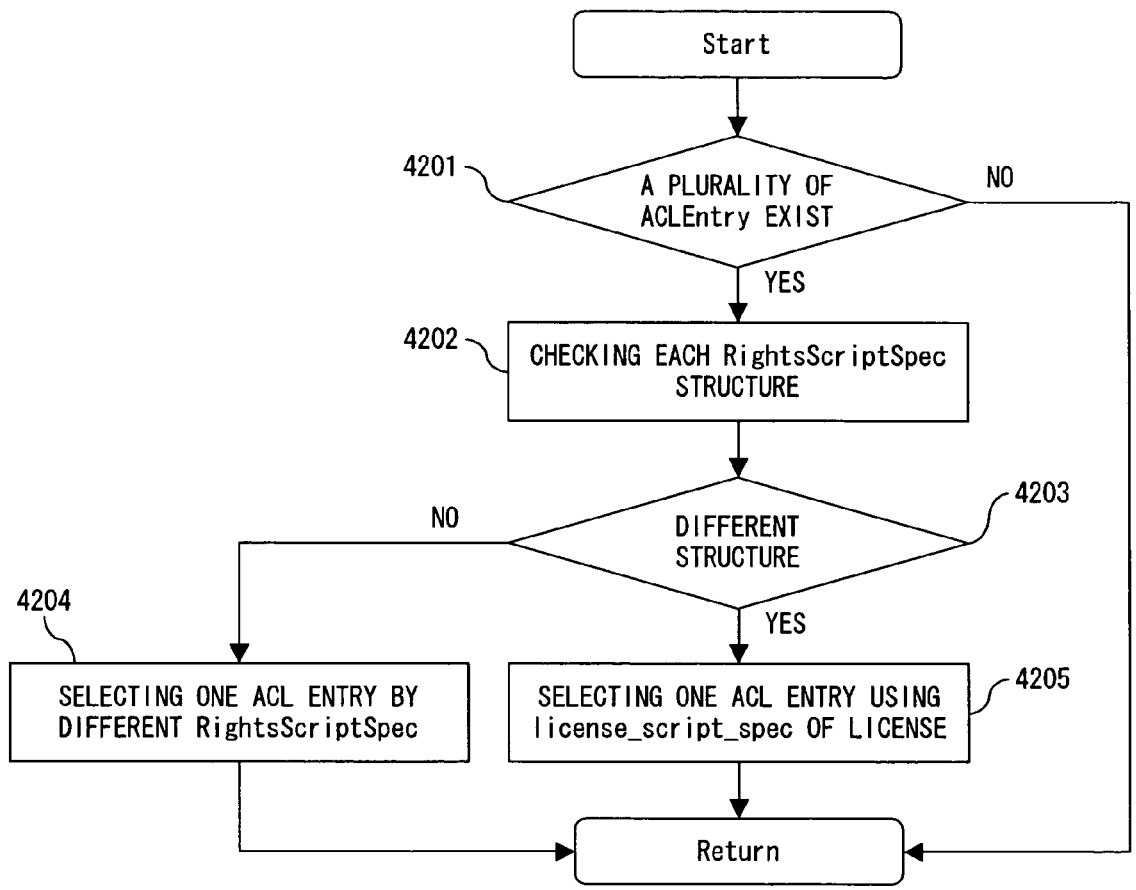
Figure 43:
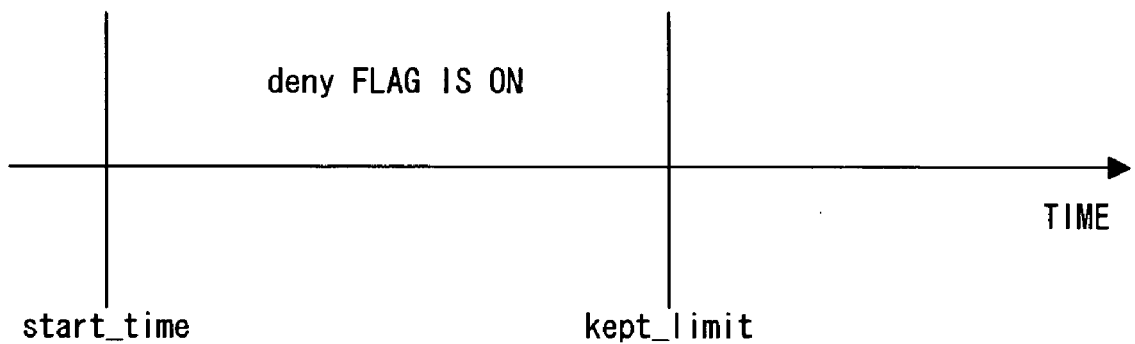
Figure 44:
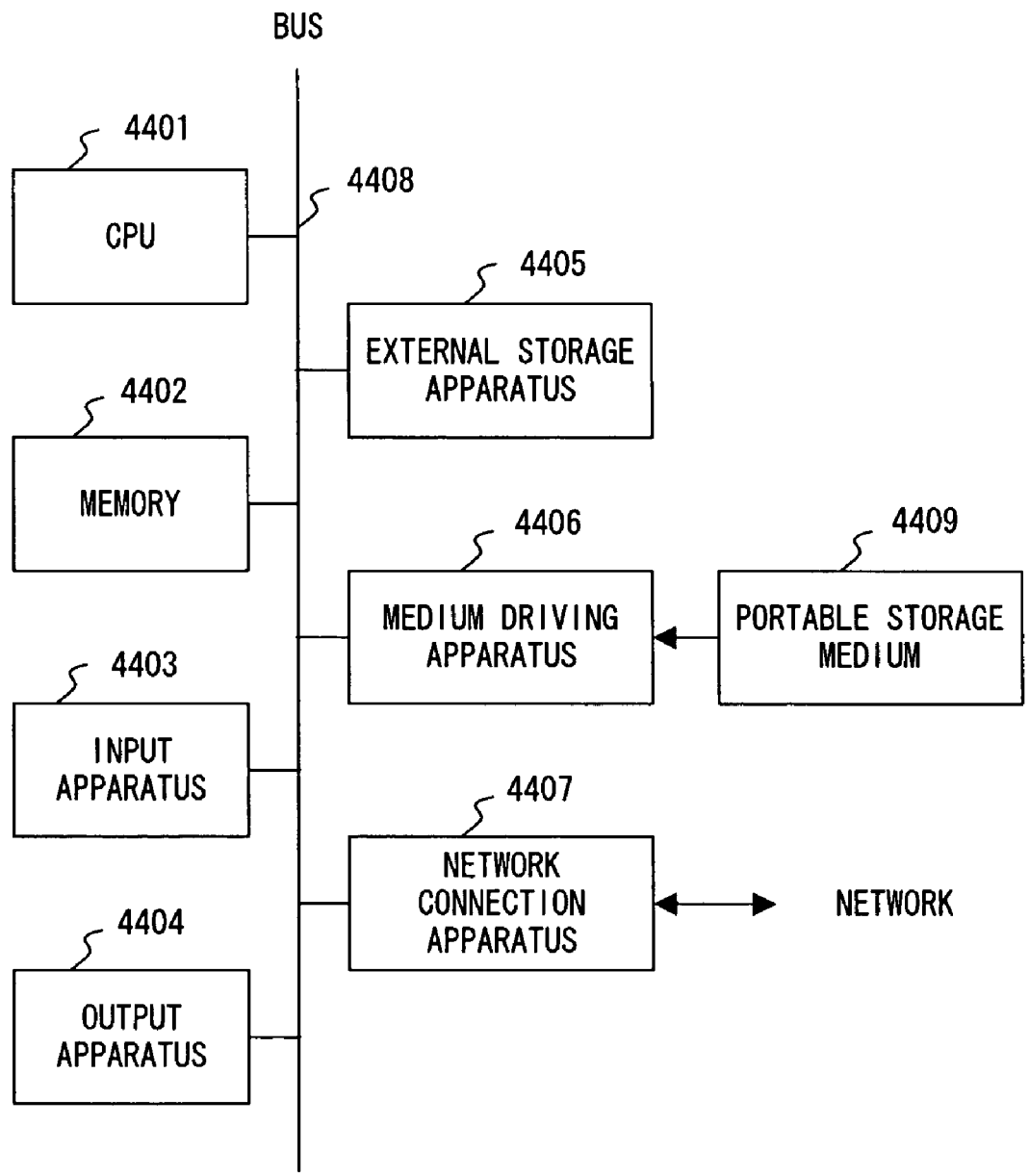

FIG. 1 shows conventional log management;
FIG. 2A is a generalized block diagram for data processing apparatus of the present invention;
FIG. 2B is a block diagram showing a content protection system;
FIG. 3 explains the unauthorized use of a license;
FIG. 4 shows a client activation function;
FIG. 5 is a flowchart of activation information generation procedures;
FIG. 6 is a flowchart of activation information generation processings;
FIG. 7 is a flowchart of activation information setting processings;
FIG. 8 shows the data structure of a license (No. 1);
FIG. 9 shows the data structure of a license (No. 2);
FIG. 10 shows an Acl structure;
FIG. 11 shows an ACLEntry structure (No. 1);
FIG. 12 shows an ACLEntry structure (No. 2);
FIG. 13 shows an ACLEntry structure (No. 3);
FIG. 14 shows an Acp structure (No. 1);
FIG. 15 shows an Acp structure (No. 2);
FIG. 16 shows an Acp structure (No. 3);
FIG. 17 shows an Acm structure (No. 1);
FIG. 18 shows an Acm structure (No. 2);
FIG. 19 shows an Acm structure (No. 3);
FIG. 20 shows a verification processing using a hash value of a route public key;
FIG. 21 shows the first comparison result of an authentic method;
FIG. 22 shows the first priority order table;
FIG. 23 is a flowchart of individual license selection processings;
FIG. 24 is a flowchart of ACL entry selection processings;
FIG. 25 shows a control using a license subject domain list;
FIG. 26 shows an offline control;
FIG. 27 shows an offline control;
FIG. 28 shows an IC card authentic sequence;
FIG. 29 is a flowchart of IC card authentic processings;
FIG. 30 shows a DecodeInformation structure;
FIG. 31 shows an EntrykeyMap type;
FIG. 32 shows an encrypted content form;
FIG. 33 shows a Content Header form;
FIG. 34 shows Content Information;
FIG. 35 shows Element Information;
FIG. 36 shows a recognition method condition list;
FIG. 37 shows a logic operation;
FIG. 38 shows the second comparison results of an authentic method;
FIG. 39 shows a RightsScriptSpec structure;
FIG. 40 shows the second priority order table;
FIG. 41 shows the third priority order table;
FIG. 42 is a flowchart of ACL entry selection processings using a client module;
FIG. 43 shows a period while a license is not distributed;
FIG. 44 is a block diagram of a data processing apparatus; and
FIG. 45 shows a storage medium.

DESCRIPTION OF THE PREFERRED EMBODIMENT

By referring to the attached drawings, a best mode in which the present invention is embodied will be explained.

FIG. 2A is a general block diagram showing first and second data processing apparatus of the present invention. The data processing apparatus of FIG. 2A comprises a storage device 101, a generation device 102 and a transmission device 103. The first and second data processing apparatuses correspond to, for example, a license distribution server 204 of FIG. 2B that is described later. The storage device 101, the generation device 102 and the transmission device 103 correspond to, for example, a memory 4402, a CPU (Central Processing Unit) 4401 and a network connection apparatus 4407 of FIG. 44, respectively, which are described later.

The first data processing apparatus distributes to a user terminal a terminal module 111 that is a program for obtaining, using a public key infrastructure, license data for decoding an encrypted digital content. The storage device 101 stores an encryption key. The generation device 102 encrypts a public key certificate required for the encryption communication based on the public key infrastructure and information about a private key for the public key, using an encryption key, thereby generating encryption information 112. The transmission device 103 includes a decoding key for decoding the encryption information 112. Furthermore, the device 103 decodes encryption information after being activated on the user terminal and transmits to the user terminal the terminal module 111 for obtaining information about the public key certificate and the private key, and the encryption information 112.

The generation device 102 takes out an encryption key from the storage device 101 and encrypts the information about a public key certificate and the information about a private key using the encryption key, thereby generating the encryption information 112. The transmission device 103 transmits the terminal module 111 and the generated encryption information 112 to a user terminal. When the terminal module 111 is activated on a user terminal, the terminal module 111 decodes the encryption information 112 using the decoding key and obtains information about the public key certificate and the private key. Then, using this information, the terminal module performs the encryption communication with a license distribution server and obtains license data 113.

In this way, if a public key certificate and the information about a private key are transmitted independently from the terminal module 111, it is sufficient to retransmit encryption information including information about a new public key certificate and a new private key even in the case where a public key certificate becomes vulnerable on a user terminal. Therefore, the re-preparation and re-installation of the terminal module 111 need not be performed so that the cost for updating a certificate can be reduced.

The terminal module 111 and the encryption information 112 respectively correspond to, for example, a client module 206 and an activation information 207 of FIG. 2B. Also, a user terminal corresponds to, for example, a client terminal 201 of FIG. 2B. An encryption key and a decoding key correspond to, for example, Ks and Km3 of FIG. 4 while a public key certificate and a private key correspond to, for example, Cci and Kci (I=1, 2, ..., n) of FIG. 4.

The second data processing apparatus receives an access request for a digital content from a user terminal and distributes license data for accessing the digital content to the user terminal as a response. The storage device 101 stores a plurality of access control lists in which a user with access permission, a permitted access pattern and license conditions are described while corresponding to the digital content. The generation device 102 obtains an access control list corresponding to a content identifier included in the access request and also corresponding to a user identifier of an applicant who transmits the access request, from the plurality of access control lists. If there are a plurality of obtained access control lists, the generation device selects one access control list from the plurality of obtained access control lists and generates individual license data based on the selected access control list. The transmission device 103 transmits the individual license data to the user terminal.

The generation device 102 refers to a list corresponding to the content identifier of an access request from a plurality of access control lists stored in the storage device 101 and extracts an access control list corresponding to the user identifier of an applicant. Then, if there are a plurality of obtained access control lists, the device selects one access control list from them and generates individual license data based on the selected access control list. The transmission device 103 transmits the generated individual license data to a user terminal as a response to the access request.

According to such a data processing apparatus, even in the case where an applicant belongs to a plurality of groups and there are a plurality of license conditions that are applied to the required content, the license condition to be applied to the applicant is automatically determined and a license can be distributed to the applicant.

The third data processing apparatus comprises a storage device and a selection device. The apparatus transmits an access request for a digital content to a license distribution apparatus and receives license data for accessing the digital content as a response from the license distribution apparatus. The storage device includes a plurality of access control lists in which both an access pattern permitted for the digital content and license conditions are described and information designating a selection processing. Furthermore, the device stores the license data received from the license distribution apparatus. The selection device implements a selection processing designated by the license data and selects one access control list from the plurality of access control lists.

The selection device refers to license data that is received from the license distribution apparatus and is stored in the storage device, and implements a designated selection processing, thereby selecting one access control list from a plurality of access control lists included in the license data.

According to such a data processing apparatus, even in the case where a license storing a plurality of license conditions for the same content is received, one license condition is automatically selected and the received license can be used, by the predetermined selection processing.

The third data processing apparatus corresponds to, for example, the client terminal 201 of FIG. 2B while the storage device and the selection device correspond to, for example, the memory 4402 and also the CPU 4401 of FIG. 44, respectively. Also, the license distribution apparatus corresponds to, for example, the license distribution server 204 of FIG. 2B while the information designating a selection processing corresponds to script_id of FIG. 39 that is described later.

According to the present invention, in the content management system by a DRM using a PKI, a public key certificate can be managed and operated using a simple method compared with the case where a strict certificate authority is used. In this way, the construction of a PKI and the development of the content management system by a DRM become easy.

Furthermore, the content management by a DRM is improved in the following points.
(1) The license to be distributed to a user who belongs to one or more groups can be automatically determined.
(2) Even in the case where a user terminal receives a license that stores a plurality of license conditions for the same content, one license condition is automatically selected so as to be used.

A DRM client module and activation information are separately generated and separately distributed in a content protection system of the present preferred embodiments. The DRM client module is a program provided with a license acquisition function and an encrypted content decoding function. Activation information includes a class public key certificate to be used and information about a private key to the public key of the certificate. Furthermore, the information is used to activate the DRM client module and also to make the function of the module effective.

A user obtains the activation information after the DRM client module is distributed. Then, the DRM client module automatically sets both a class public key certificate and a private key that are stored in the activation information to the DRM client module. After that, the DRM client module obtains a license from the license distribution server.

FIG. 2B is a block diagram showing such a content protection system. The content protection system of FIG. 2B comprises a client terminal 201 and a content management system 202. This content management system 202 includes a user management server 203, the license distribution server 204 and a content server 205. The client terminal 201, the user management server 203, the license distribution server 204 and the content server 205 correspond to, for example, a data processing apparatus (computer) and those devices can communicate mutually through a communication network.

The client terminal 201 is the terminal of a user who uses content. It downloads the encrypted content from the content server 205 while it downloads a license from the license distribution server 204, and it decodes the encrypted content in accordance with a license condition of the license.

The content server 205 is provided with a database to store the encrypted content while the user management server 203 is provided with a database to store management information about an authentic method for each user, etc. The license distribution server 204 is provided with a database to store a license and separately generates the client module 206 that is a DRM client module and the activation information 207, thereby distributing them to the client terminal 201. The client module 206 comprises a decoding module 208 and a licensing agent 209.

The licensing agent 209 distributed to the client terminal 201 obtains the activation information 207 that is separately distributed. Then, the licensing agent 209 obtains a license from the license distribution server 204 and the decoding module 208 decodes the encrypted content using the license.

Here, in the case where the licensing agent 209 receives any activation information, a malicious user starts up a false license distribution server and distributes cursory activation information. As a result, there is the possibility that a license is passed to a decoding module prepared by the user and the license is abused.

For example, assume a case where a right license distribution server 301 distributes a licensing agent 303 and a decoding module 304 to a client terminal as shown in FIG. 3. In the case where a user without malice uses the content, a licensing agent 303 obtains a license 313, after it obtains activation information 311 from the license distribution server 301.

However, if a malicious user prepares a false decoding module 305 in a client server, starts up a false license distribution server 302 and distributes false activation information 312, there is the possibility that the licensing agent 303 passes the license 313 obtained from the license distribution server 301 to the decoding module 305.

In the present embodiment, thereupon, a "client activation function" for securely and automatically materializing certificate issuance and embedding is assumed as follows:

(1) The following processes are automatically implemented at the time of installing a license distribution server.
  Generating a set of the private key of certificate authority and a public key certificate, thereby maintaining the set in the module of a certificate authority.
  Registering a public key certificate of the certificate authority in a license distribution server.
(2) The following processes are automatically implemented using a "client activation command (function)".
  Generating a set of the private key and public key of a client module.
  Inputting the public key into a module of the certificate authority and directing the module to issue a public key certificate.
  Embedding the private key, the public key certificate and the public key certificate of the certificate authority in the designated client module
  Storing for management, a correspondence table of client names and certificate lists.
(4) The following processes are automatically implemented using "certificate revocation command (function)".
  Designating a certificate to be revoked.
  Generating a CRL (Certificate Revocation List) by adding a designation certificate to a conventional CRL in the certificate authority.
  Setting up the generated CRL in the license distribution server.
(4) A universal public key certificate (Universal Certificate) is retained in a client activation function and the mutual operations can be performed among global DRM (Digital Copyrights Management).

More specifically, an operation of the certificate authority and a function for activating a client are installed in a license distribution server management and operation system. The client module is turned into a Tamper Resistant Module (TRM) not for each certificate issuance but at the time of offering and version-upgrading a client module. The issuance of a client module activation key is automatically performed using an activation key automatic issuance function on the management and operation system.

FIG. 4 shows the configuration of materializing such a client activation function. Here, a case such that a license distribution server management and operation system is provided in the license distribution server 204 is assumed. The license distribution server 204 includes a client activation module 402, a certificate authority module 403 and a storage apparatus 404. The client terminal 201 includes a storage apparatus 405.

The notation of a key and a certificate that are used in FIG. 4 are as follows:

{X} K: Information X is encrypted so as to be decoded by a key K.
Km2: A contract key. A key necessary for securely offering secret information to each client (content registrants, content users, etc.). Either public key encryption method or symmetric key encryption method is available. A client sets up this key in the license distribution server 204.
Cr1: A public key certificate of a certificate authority. With self signature.
Kci (I=1, 2, ..., n): The private key of a DRM class.
Cci (I=1, 2, ..., n): A class public key certificate corresponding to Kci.
Ks: A session key that is changed for each transmission of a client module activation key. The key of a symmetric key encryption method.
Km3: A client master key. A private key of the symmetric key encryption method to be embedded in the client module by a maker. One client module can possess Km3s of several types.

The contract key Km2 is shared with a client and a license distribution server management and operation system. Km2 is generated by an activation key generation tool 401 and is updated for each period after it is distributed. The client master key Km3 is shared with a client and the client module. The client module activation key {Ks} Km3∥{Ks} Km2 is generated by the activation key generation tool 401. It is issued at the time of offering and version-upgrading the client module 206. The client activation module 402 generates the activation information 207 using a contract key and a client module activation key.

FIG. 5 is a flowchart of activation information generation procedures by an operator of the license distribution server 204. The management and operation system first performs an initialization processing (step 501) and determines the results (step 502). In the initialization processing, the acquisition of the public key certificate of a route certificate authority, etc. is performed.

If the result is OK, a contract key acquisition processing is performed (step 503) as shown in FIG. 4(a) and the result is judged (step 504). In this way, the contract key Km2 is securely set up in the client activation module 402.

If the result is OK, a client module activation key acquisition processing is performed next (step 505) and the result is judged (step 506). In this processing, as shown in FIG. 4I, the issuance of a client module activation key is asked for the activation key generation tool 401 and as shown in FIG. 4(d), the issued client module activation key {Ks}Km3||{Ks}Km2 is received from the activation key generation tool 401. The client module activation key may be obtained by exchanging E-mails.

If the result is OK, an activation information generation processing is next performed (step 507) and the result is judged (step 508). If the result is NG in steps 502, 504, 506 and 508, an error processing is performed (step 509).

FIG. 6 is a flowchart of the activation information generation processings that are performed by the client activation module 402 in step 507 of FIG. 5. The client activation module 402 first performs a client module activation key acquisition processing (step 601) and the result is judged (step 602).

If the result is OK, the client module activation key is decoded using the contract key Km2, the session key Ks is obtained (step 603) and the result is judged (step 604).

If the result is OK, the DRM class private key Kci and the class public key certificate Cci are next obtained (step 605) and the result is judged (step 606). At this time, the certificate authority module 403 issues the class public key certificate Cci as shown in FIG. 4(e).

If the result is OK, the DRM class private key Kci and the class public key certificate Cci are encrypted using the contract key Km2 (step 607) as shown in FIG. 4(f) and the result is judged (step 608). At this time, the public key certificate Cr1 generated by the certificate authority as shown in FIG. 4(b) is encrypted together with Kci and Cci.

If the result is OK, the encrypted information and {Ks}Km3 that is a part of the client module activation key are connected as shown in FIG. 4(g) so that the activation information 207 is generated (step 609) and the result is judged (step 610). If the result is NG in steps 602, 604, 606, 608 and 610, an error processing is performed (step 611).

The generated activation information 207 together with the client module 206 that is turned into a TRM are embedded in an activation client module 411 of the storage apparatus 404, as shown in FIG. 4(h). Then, the module is distributed into a domain as shown in FIG. 4(i). In this way, the activation client module 411 is stored in the storage apparatus 405 of the client terminal 201 that is a distribution destination.

FIG. 7 is a flowchart of the activation information setting processings by the client module 206 inside the client terminal 201. When the client module 206 is activated on the client terminal 201 as shown in FIG. 4(j), it first obtains the activation information 207 (step 701) and the result is judged (step 702).

If the result is OK, the activation information is decoded using the client master key Km3 as shown in FIG. 4(k), and Kci and Cci are obtained (step 703), thereby judging the result (step 704). In this processing, {Ks} Km3 is first decoded using Km3 and Ks is obtained. Then, the remaining activation information is decoded using Ks, and Kci, Cci and Cr1 are obtained.

If the result is NG in steps 702 and 704, an error processing is performed (step 705).

Then, the client module 206 communicates with the license distribution server 204 using the obtained DRM class private key and certificate, and obtains a license.

According to such a mechanism, in the case where the class public key certificate of the client terminal 201 becomes vulnerable, the re-production and re-installation of the client module 206 need not be performed and it is sufficient to only replace the activation information 207. Therefore, the cost for updating a certificate can be reduced.

Meanwhile, a PKI is configured utilizing the certificate authority module 403 inside the license distribution server 204 according to the configuration of FIG. 4. Instead, an external certificate authority 406 can be used. In addition to the DRM class private key Kci and the class public key certificate Cci, a set of a private key Kcu and a universal public key certificate Ccu may be added to the activation information 207.

The following is the detailed explanation of the mechanism of a content protection system, while showing the example of a license to be used in the present preferred embodiment.

FIGS. 8 and 9 show the data structure of a license (LicenseInfo structure). FIG. 10 shows an Acl structure that is the data of an acl (access control list) field of FIG. 9. FIGS. 11, 12 and 13 show ACLEntry structure that is the data of the acl_entry field of FIG. 10. FIGS. 14, 15 and 16 show Acp structure that is the data of an acp (decoder access condition) field of FIG. 11. FIGS. 17, 18 and 19 show an Acm structure that is the data of an acm (medium access condition) field of FIG. 11.

In order to solve such a problem that a license is passed to a decoding module prepared by a malicious user and the license is abused as mentioned above, the following steps are taken. As shown in FIG. 9, a field such as rpk_hash_list is provided in a license and the list of a hash value of a route public key to be used for a certificate check performed at the time of the issuance of a license is stored. Also, route public key certificates are respectively stored in the decoding module 208, the licensing agent 209 and the license distribution server 204.

As shown in FIG. 20, the licensing agent 209 of the client terminal 201 transmits a license acquisition request to the license distribution server 204. At this time, the licensing agent 209 transmits the hash value rpk_hash_value of the route public key of a certificate to the license distribution server 204 and the license distribution server 204 verifies the received hash value.

The license distribution server 204 compares the received hash value with a hash value that is stored in rpk_hash_list of a license. If a corresponding value exists in the list, a license is distributed. If there is no corresponding value in the list, a license is not distributed.

Similarly, also in the client terminal 201, a processing using the field rpk_hash_list is performed between the decoding module 208 and the licensing agent 209. The decoding module 208 transfers the hash value rpk_hash_value of a public key to the licensing agent 209 and then the licensing agent 209 verifies the hash value. If a corresponding value exists in the list of a license exists, the license is transferred to the decoding module 208 while in the case where the corresponding value does not exist in the list, the license is not transferred.

By performing such a verification processing, it becomes possible not to pass a license to a decoding module prepared by a malicious user.

The following is the explanation of a processing of automatically determining a license to be distributed to a user who belongs to one or more groups.

The license distribution server 204 registers in a database, a user or a user group with permission for gaining access to a content corresponding to a content or an aggregation of contents and an Access Control List (ACL) that describes access patterns and license conditions to be permitted for the user or the user group. Whenever an access request occurs on the client terminal 201, the request information is transmitted from the client terminal 201 to the license distribution server 204 and then the license distribution server 204 distributes a license as a response.

At this time, the license distribution server 204 judges the advisability of access performed by a user or a user group and generates an individual license from the ACL corresponding to the content. Specifically, after the server generates the license condition for an applicant from both the ACL entry of a group to which an applicant belongs and the ACL entry for an applicant, it generates an individual license. The following is the generation procedures of the individual license.

1. Acquisition of ACL Entry

User ID and group ID are included in the ACLEntry structure (FIG. 11) of each ACL entry that is registered in a database. Thereupon, an ACL entry with the user ID and the group ID obtained by a checkPrincipal method of the class in which a specifiedAPI (Application Program Interface) is installed is obtained from a plurality of ACL entries corresponding to the requested content identifier (content_id). This checkPrincipal method is a method of obtaining the user information and group information of a user from the user management server 203 based on the user authentication information of a user.

2. Judgment of Validity of ACL Entry

In the case where the obtained ACL entry satisfies any of the following conditions (1) to (7), this ACL entry is deemed invalid. In the case where all the obtained ACL entries are invalid, the request is denied and a processing terminates. Especially, in the case where an ACL entry satisfies a condition (2), the request is immediately denied and a processing terminates.

(1) A license kept time limit (kept_limit) and a license start time (start_time) (FIG. 19) that are included in an Acm structure are invalid.

(2) A preferential deny flag (deny flag) (bit7 of FIG. 18) that is included in an Acm structure, is on.

(3) The number of rights (FIG. 19) that are included in the Acm structure is 0 (rights_count==0)

(4) The count of operations that is granted for a content (FIG. 17) that is included in the Acm structure is 0 (operation_count==0)

(5) The subject of a certificate at the time of Open does not correspond to a license subject domain list included in the Acm structure (subject_list) (FIG. 19).

(6) The operation requested by Get_License does not agree with the operation (FIG. 11) of the ACLEntry structure. The Get_License corresponds to the license acquisition request that is transmitted to the license distribution server 204 from the client terminal 201.

(7) An authentication system such that a bit of the authentication system condition list (authentication_list) obtained by a checkPrincipal method is 0 and a bit of authentication_list (FIG. 12) of the ACL entry corresponding to the bit is 1, exists in bit0 to bit7.

In the example of FIG. 21, in bit1, the condition obtained by checkPrincipal does not satisfy authentication_list that is set in an ACL entry. Therefore, this ACL entry cannot be used for individual condition setting.

3. Judgement of License Use Pattern (Online/Offline)

(1) In the case where a sequential (dynamic) license designation flag (dynamic_license flag) of the acm of Get_License is on:

From all the ACL entries that remain after the processings 1 and 2 are performed, only the ACL entries having dynamic_license flags that are on are remained. In the case where dynamic_license flags of all the ACL entries that remain after the processing 1 and 2 are performed are off, the request is denied. In this case, reject code is 8111h and it is indicated that an effective ACL entry does not exist.

A sequential (or online) license is a license that is used immediately after the issuance and is nullified by the client terminal 201 after use. On the contrary, an offline license is stored once in the client terminal 201 and then can be used even if it is not connected with the license distribution server 204.

(2) In the case where the dynamic_license flag of an acm of Get_License is off or an acm is not designated:

Only ACL entries having dynamic_license flags that are off are saved out of all the ACL entries that remain after the above-mentioned processings 1 and 2 are performed. In the case where the dynamic_license flags of all the ACL entries that remain after the processings 1 and 2 are performed are on, the request is denied. The reject code in this case is also 8111h.

4. Selection of ACL Entry and Distribution of Individual License (1) In the case where acm and acp are not designated by Get_License:

An ACL entry is selected in accordance with the priority order table of FIG. 22. In the case where a plurality of ACL entries are selected by the selection rule of a certain priority order, an ACL entry is selected in accordance with the selection rule of the next priority order.

Practically, since a partial copying prohibition flag does not become on in a partial copying license permitting partial copying of a content, the selection rule of a priority order 4 is not used at the time of selecting a partial copy license. Furthermore, since a preservation prohibition flag does not become on in a preservation license permitting the storage of a content, the selection rule of a priority order 5 is not used at the time of selecting a preservation license. Furthermore, since a printing prohibition flag does not become on in a printing license permitting the printing of a content, the selection rule of a priority order 6 is not used at the time of selecting a printing license.

In the case where a plurality of ACL entries remain after the above-mentioned selection processing is performed, ACL entries are selected based on the order registered in the database.

(1) In the case where an acm and an acp are designated by Get_License:

An ACL entry that satisfies an acm and an acp designated by Get_License is selected from the remaining ACL entries and then the selected entry is stored in an individual license to be distributed.

(2-1) In the case where there are a plurality of ACL entries that satisfy an acm and an acp:

An ACL entry is selected in accordance with the priority order table of FIG. 22. In the case where a plurality of ACL entries still remain, one ACL entry is selected in accordance with the order registered in a database.

(2-2) In the case where there is no ACL entry that satisfies an acm and an acp:

The request is denied and processings terminate. A reject code is 8111h.

After one ACL entry is finally selected in accordance with the above-mentioned procedures, a license having the ACL entry is distributed. At this time, move_count of a license is set to 00h while rights_count is set to 01h and they are distributed. However, an ACL entry having a dynamic_license flag that is on is selected, a sequential online license (operation_count 01h, move_count 00h, rights_count 01h) is distributed.

5. Subtraction Processing of a Database on a Server Side:

The license distribution server 204 subtracts by 1, rights_count of the ACL entry that is selected in the above-mentioned processing 4.

FIG. 23 is a flowchart of such individual license selection processings. According to the above-mentioned processing 1, the license distribution server 204 first obtains a group ID list of the group to which an applicant belongs, from the user management server 203 (step 2301) and judges the result (step 2302). If two or more groups to which an applicant belongs exist, an ACL entry is selected by the processings 2 and 3 (step 2303) and the result is judged (step 2304).

Here, in the case where a plurality of ACL entries remain, only one ACL entry is selected and a license is distributed (step 2305). Then, the number of rights of a database is subtracted by 1 by the processing 5 (step 2306).

In the case where the number of groups to which an applicant belongs is "1" in step 2302 and in the case where only one ACL entry remains in step 2304, a license is immediately distributed (step 2305) and a processing in step 2306 is performed. Furthermore, in the case where the number of groups to which an applicant belongs is "0" in step 2302, the request nullification is notified to the applicant (step 2308).

FIG. 24 is a flowchart of the ACL entry selection processings in step 2303 of FIG. 23. The license distribution server 204 judges the validity of an ACL entry by the above-mentioned processing 2 (step 2401) and judges the result (step 2402).

If the ACL entry is valid, it is judged whether or not the ACL entry satisfies requests by the processing 3 (steps 2403 and 2404). If the ACL entry that satisfies the requests exists, a processing returns to that of FIG. 23 as the result of selection. If no ACL entry that satisfies the requests exists, the request nullification is notified to an applicant (step 2405).

According to such an individual license selection processing, a license to be distributed to a user who belongs to one or more groups can be automatically determined.

The following is the explanation of both a control of determining access advisability when a license is downloaded into a client terminal and a control of securely passing the downloaded license to another client terminal. In this control, a license and denial domain is restricted using the list of the subject of a public key certificate (X. 509 certificate).

The subject of a public key certificate is a name for identifying an entity for providing a certificate and it is generally described by X. 500 name system. For example, a person called hana who belongs to the network division of TRUST Co., Ltd. is described as follows:

{Country=JP, Organization=TRUST Corp., OrganizationUnit=Network, CommonName=hana}

In this way, a form for describing one entry is defined by an X. 500 directory system and it is called DN (Distinguished Name). In addition, one part of the DN is called as RDN (Relative Distinguished Name). The RDN is a relative distinguished name defined by X. 501. The DN is an absolute distinguished name defined by X. 501. The RDN of hana is, for example, as follows:

{Country=JP, Organization=TRUST Corp.},
{Organization=TRUST Corp.},
{CommonName=hana}

Here, a range in which a license is distributed and moved is controlled by the DN of a public key certificate (medium class public key certificate) possessed by a client terminal. Therefore, a list of DNs and RDNs to be licensed is set as one of the license conditions of a license, in the license subject domain list of ACL entries (subject_list) (FIG. 19).

Then, the RDN included in the DN of a public key certificate is obtained out in an significant order and the obtained RDN is compared with each entry (RDN) of a license subject domain list. If the antecedence RDN of the subject of a public key certificate agrees with a certain entry in the list, this access is licensed. In this way, a control such that a license is distributed only to a client terminal that agrees with the RDN in a license subject domain list becomes possible.

For example, assume that there are TRUST Co., Ltd. 2501 and IT Co., Ltd. 2502, and there are a network division 2511 and a software division 2512 in TRUST Co., Ltd. 2501, as shown in FIG. 25. At this time, in the case where certain protection information is shared between the network division 2511 of TRUST Co., Ltd. 2501 and IT Co., Ltd. 2502, it becomes possible not to distribute a license to other organizations by setting the following information in a license subject domain list. However, the RDN is designated in order from the most significant RDN.

{Country=JP, Organization=TRUST Corp., OrganizationUnit=Network},
{Country=JP, Organization=IT Inc.}

In accordance with this license subject domain list, the license distribution server 204 distributes a license to the network division 2511 of TRUST Co., Ltd. 2501 and IT Co., Ltd. 2502 but it does not distribute a license to the software division 2512 of TRUST Co., Ltd. 2501.

Since a license subject domain list is stored in a license as one of license conditions and then it is distributed, a licensing agent of the client terminal that receives a license interprets the list and it can copy and move the license within the range shown in the list.

Therefore, as shown in FIG. 26, after a license is distributed to IT Co., Ltd. 2502, the licensing agent of IT Co., Ltd. 2502 copies and moves the license to the network division 2511 of TRUST Co., Ltd. 2501 in accordance with the above-mentioned license subject domain list. However, the license is not copied and moved to the software division 2512 of TRUST Co., Ltd. 2501.

The following is the explanation of a method of securely copying and moving a distributed license to another client terminal using an IC (Integrated Circuit) card. In this method, a DN is inserted into a license to be distributed to a client terminal and a client module confirms whether or not the inserted DN agrees with a DN of the IC.

In this case, as shown in FIG. 27, an IC card authentication linkage module 2701 is provided in the client module 206. This IC card authentication linkage module 2701 is a module for authenticating a user for the client module 206 using an IC card 2702. The certificate of an IC card user is stored in the IC card 2702 and the IC card 2702 is inserted into a slot of the client terminal 201. The client module 206 copies and moves a license only to the authenticated IC card 2702.

FIG. 28 shows an IC card authentication sequence performed by the IC card authentication linkage module 2701. In this sequence, a random number is generated each time, the number is signed and the authentication is performed by verifying this signature.

The IC card authentication linkage module 2701 interrogates the IC card 2702 about the current condition when a license is used and it confirms whether or not the IC card 2702 is connected to the client terminal 201. It requires a user to insert an IC card and to input a Personal Identification Number (PIN) code in the case where the IC card is not inserted.

Upon receipt of this request, a user inserts the IC card 2702 into the client terminal 201 and inputs a PIN code (procedure 2801).

Then, the IC card authentication linkage module 2701 generates a random number and transmits the random number to the IC card 2702 using a secure session that is a function of the IC card 2702 (procedure 2802).

The IC card 2702 performs a digital signature to the received random number using an encryption key for a possessed certificate (Procedure 2803). Then, the digital signature and the certificate are transmitted to the IC card authentication linkage module 2701 using the secure session.

The IC card authentication linkage module 2701 verifies the validity of a certificate of the IC card 2702 (procedure 2804) and checks whether or not the DN of the certificate is identical to the account that currently logs into the client terminal 201 (whether or not the DN of the certificate agrees with the DN of the distributed license) (procedure 2805). Consequently, the module verifies the digital signature received from the IC card 2702 using the certificate (procedure 2806).

For a DN check, the data to map both the DN of a certificate of the IC card 2702 and the account of the client terminal 201 are required but it is assumed that the IC card authentication linkage module 2701 possesses such data.

While the IC card 2702 is connected to the client terminal 201, a user need not input a PIN code. Accordingly, the authentication of the IC card 2702 is performed in accordance with the sequence in and after the procedure 2802.

FIG. 29 is a flowchart of such IC card authentication processings. The IC card authentication linkage module 2701 first generates a random number (step 2901) and transmits the random number to the IC card 2702 (step 2902). Then, a digital signature and a certificate are received from the IC card 2702 (step 2903), the validity of the certificate is verified (step 2904) and the result is judged (step 2905).

If the result is OK, the DN of the certificate is checked next (step 2906) and the result is judged (step 2907). If the result is OK, the digital signature is verified next (step 2908) and the result is judged (step 2909). If the result is NG in steps 2905, 2907 and 2909, an error processing is performed (steps 2910, 2911 and 2912).

Meanwhile, a license is copied and moved using an IC card in this example but an optional computer-readable portable storage medium other than an IC card can be used.

The following is the explanation of a method of performing a log operation by a license distribution server for each operation such as the display, printing, storage, partial copying, transfer, mail attachment etc. of a content in a client terminal, in order to deal with a problem such that the alteration, tampering, etc. of a log is carried out on a client terminal.

In this method, a field that shows the operation classification of a content such as "operation" is set in a license (FIG. 11). A user requires a license of the desired operation classification of the license distribution server, depending on which operation to be performed. Then, the license distribution server specifies the operation for the content of a client terminal by storing log data that shows which operation classification is distributed for a license distribution to the client terminal as a license.

According to such log management, log data is prepared and managed on a server side so that the possibility of alternation, tampering, etc., of data made by a user is very low.

The following is the explanation of a method of, at a time, obtaining a license for those contents when a client terminal uses a plurality of encrypted contents. In this method, license conditions and decoding keys corresponding to a plurality of contents are stored in a license and those contents are controlled. Furthermore, by providing in a license, a field that can store a plurality of fields of an ACL entry representing a license condition for one content (FIG. 10), a plurality of license conditions can be distributed once.

FIG. 30 shows a DecodeInformation structure (FIG. 9) that is the data of content decoding information (decode_information) in a license while FIG. 31 shows an ElementKeyMap type that is the data of a list (element-key-map) corresponding the encrypted content element in a DecodeInformation structure to a decoding key.

The encrypted content is generally distributed in a form like FIG. 32 and can store N different elements (content). FIG. 33 shows a form of the header (Content Header) of FIG. 32 and FIG. 34 shows the content information (Content Information) of FIG. 33. FIG. 35 shows each element information (Element Information) of FIG. 33. By using the DecodeInformation structure of FIG. 30, a decoding key corresponding to a plurality of elements (content) of FIG. 32 can be stored in a license.

In addition, in an ACLEntry structure that is the data of an ACL entry, a field of the license content element number list (element_list) (FIG. 13) exists and the element number of an element that can be used using the license condition of this ACL entry is stored. Therefore, the license conditions corresponding to a plurality of elements can be stored in a license by using the Acl structure of FIG. 10.

The following is the explanation of a method of controlling access by providing a field of describing an authentication system in the ACL entry of a license and comparing the authentication system in which a user was authenticated in the past with the authentication system described in the field. In this method, a logic operation of the two authentication methods to be compared is performed and the operation result is used as an access condition.

The license distribution server 204 makes an inquiry to the user management server 203 determining which authentication method a user is authenticated by, thereby obtaining the authentication method condition. Then, the server compares the obtained condition with the authentication method condition list (authentication_list) (FIG. 12) that is stored in a license requested by the client terminal and it determines the advisability of the distribution of a license. In the authentication_list, an authentication method required at the time of the registration of a license is set.

Specifically, the authentication_list in a license is the data of a bit string in which each bit is mapped onto each authentication method and comprises eight bits as shown in FIG. 36. A bit corresponding to the required authentication method is set on (logic 1).

When the license distribution server 204 maps the information of the authentication method obtained from the user management server 203 onto the data in the form of FIG. 36, it directs the corresponding bit on if a user normally terminates the authentication using each authentication method. For example, in the case where a user is already authenticated using an ID/password method and a signature method, a value 00001001 is generated.

Only in the case where an authentication method such that a bit of the generated data is 0 and a bit of authentication_list corresponding to the bit of the generated data is 1 exists, the license distribution server 204 does not distribute a license.

When this control is explained using proposition logic, a logical operation A ⇒B is first performed for each bit as shown in FIG. 37 while setting a bit of authentication_list as A and a bit of the mapped data as B. Then, if even one bit 0 that is exists, a processing of denying the distribution of a license is performed.

In the example of FIG. 38, since in bit1, the condition obtained from the user management server 203 does not satisfy the authentication_list in a license, the license is not distributed to the client terminal 201. According to such a control, the distribution of a license to the client terminal that is not authenticated by the content protection system of a DRM can be prevented.

The following is the explanation of a method of, in the case where a client terminal receives a license that stores a plurality of license conditions for the same content, selecting one license condition from them in accordance with registrant's intention and using the selected license.

There is a field (FIG. 8) such as license_script_spec in a license while there is a field (FIG. 11) such as rights_script in the ACLEntry structure. In the data of these fields, a RightsScriptSpec structure shown in FIG. 39 is included. A license condition selection processing is corresponded to the identifier (script_id) described in the RightsScriptSpec structure.

As the example of a license condition selection processing, an ACL entry selection processing based on the above-mentioned priority order table of FIG. 22 is included. In addition, script_id, is assigned to the priority order table in which the priority order of a license condition is replaced, as shown in FIG. 40. Furthermore, script_id is assigned to the priority order table in which a selection rule is changed, as shown in FIG. 41. In this way, the RightsScriptSpec structure designates a processing of selecting one ACL entry from a plurality of ACL entries.

Moreover, the selection rule described in the priority order table may be disclosed on a Web, etc., so that any person who uses a license distribution system can see the rule. In this way, a registrant can grasp how a license condition is selected.

FIG. 42 is a flowchart showing the processings of selecting an ACL entry by the client module 206, using the RightsScriptSpec structure of the received license. The client module 206 first checks whether or not a plurality of ACL entries exist in a license (step 4201). If only one ACL entry exists, this ACL entry is selected.

If a plurality of ACL entries exist, the module checks the RightsScriptSpec structure of rights_script of each ACL entry (step 4202) and determines whether or not those are the same (step 4203).

If those RightsScriptSpec structures are the same, one ACL entry is selected by the license condition selection processing corresponding to the script_id (step 4204). If there is a structure different from those RightsScriptSpec structures, one ACL entry is selected by the license condition selection processing corresponding to script_id of the RightsScriptSpec structure of license_script_spec (step 4205).

Then, the following is the explanation of the measures for the problem where data is stolen at the time of editing content. At the time of copying a part of the content and inserting the copied part into a clipboard while a user is editing the content, the client module 206 encrypts the data of the copied part and inserts the data into a clipboard. Only in the case where a person with permission performs a paste operation, the encrypted data is decoded to be pasted. In this way, a control of restricting the editing operation (copying and pasting) for a protection document only to a licensed person is forcibly materialized.

In the license of the preferred embodiment of the present invention, information for further materializing the following controls is included.

(1) A preferential denial control to a user and a group is performed while a denial period and a denial domain are restricted.

An issuance period is controlled by restricting a license issuance period to a period from a license start time to a license retention period. The issuance of a license is preferentially denied whichever license may be assigned to a user of an issuance destination and a group to which a user belongs within the license issuance period.

As shown in FIG. 19, the fields of kept_period, kept_limit and start_time are provided in a license. In the kept_period, a license retention period is stored, in the kept_limit, a license retention limit is stored and in the start_time, date and hour when the distribution of a license starts (license start time) is stored. In a predetermined period, the license distribution server 204 controls whether or not the user of an access control target uses a content by interlocking this information and the deny flag of FIG. 18.

In the case where start_time and kept_limit are set and a deny flag is set on, in the ACL entry to a certain user, a license is not distributed to a user within a period from start_time to kept_limit as shown in FIG. 43.

(2) When an offline license is first used, a user sets a password and the content registrant can designate a period while the password can be inputted.

In the case where an offline license is used using password authentication, a field (FIG. 12) such as password_min_len for storing the minimum length of a password to be used when offline and a field (FIG. 13) such as pw_input_period for storing a period of time from the arrival of a license at a client terminal to the input of a password in the client terminal are set in a license.

A user inputs a password of which the length is longer than the length that is set in the password_min_len within a period predetermined in the pw_input_period, and the client module 206 stores and sets the password. Since then, a user uses the set password when he or she uses a license with an offline.

(3) DRM technology and linkage method of superposition display/printing:

It is conceivable in the present protection method by DRM that for example, while a malicious user is displaying a protection document, he or she photographs the display screen using a digital camera and gives the photographed data to a third party. In addition, it is also conceivable that a malicious user justifiably obtains a license having printing authority, copies the printed protection document using a copy machine and passes the copied document to a third party.

Thereupon, superposition information such as the attribute information of a license issuance date, a license issuance source, a group to which the issuance source belongs, etc. is stored in a license. The client module 206 that obtains a license in which the superposition information is stored forcibly displays or prints the superposition information when a content is displayed or printed. In this way, the distribution route of a content becomes easy to be specified since the information about who displays a content and when a content is displayed is added to the content.

Meanwhile, the client terminal 201, user management server 203, license distribution server 204 and content server 205 of FIG. 2B are configured using, for example, a data processing apparatus (computer) as shown in FIG. 44. The data processing apparatus of FIG. 44 includes a Central Processing Unit (CPU) 4401, a memory 4402, an input apparatus 4403, an output apparatus 4404, an external storage apparatus 4405, a medium driving apparatus 4406 and a network connection apparatus 4407, and those devices are connected mutually by a bus 4408.

The memory 4402 includes, for example, a ROM (Read Only Memory), a RAM (Random Access Memory) etc. and stores the program and data to be used for a processing. The CPU 4401 performs required processings by implementing a program utilizing the memory 4402.

The storage apparatuses 404 and 405 of FIG. 4 correspond to the memory 4402 or the external storage apparatus 4405. The client module 206, the decoding module 208 and the licensing agent 209 of FIG. 2B, the activation key generation tool 401, the client activation module 402 and the certificate authority module 403 of FIG. 4 and the IC card authentication linkage module 2701 of FIG. 27 correspond to the program or the function stored in the memory 4402.

The input apparatus 4403 includes, for example, a keyboard, a pointing device, a touch panel, etc., which are used for the input of instructions and information from operators such as a content registrant, a manager, a user, etc. The output apparatus 4404 includes, for example, a display, a printer, a speaker, etc., which are used for the output of inquiries to an operator or the output of processing results, etc.

The external storage apparatus 4405 includes, for example, a magnetic disk, an optical disk, a magneto-optical disk, a tape, etc. A data processing apparatus stores the above-mentioned program and data in the external storage apparatus 4405 and uses them by loading them into the memory 4402 as occasion requests. In addition, the external storage apparatus 4405 is used for databases of the user management server 203, the license distribution server 204 and the content server 205.

The medium driving apparatus 4406 drives a portable storage medium 4409 and gains access to the recorded content. The portable storage medium 4409 is an optional computer-readable storage medium such as a memory card, a flexible disk, a CD-ROM (Compact Disk Read Only Memory), an optical disk, a magneto-optical disc, etc. An operator stores the above-mentioned program and data in the portable storage medium 4409 and uses them by loading them into the memory 4402 as occasion requests.

The network connection apparatus 4407 is connected to an optional communication network such as a LAN (Local area network), the Internet, etc. and performs a data transformation associated with communications. The data processing apparatus receives the above-mentioned program and data from an external apparatus through the network connection apparatus 4407 and uses the data and program by loading them into the memory 4402.

FIG. 45 shows a computer-readable storage medium for supplying a program and data to the data processing apparatus of FIG. 44. The program and data stored in the portable storage medium 4409 or a database 4511 of a server 4501 are loaded into the memory 4402 of a data processing apparatus 4502. The server 4501 generates a conveyance signal for conveying the program and data and transmits this signal to the data processing apparatus 4502 through an optional transmission medium on a network. The CPU 4401 implements the program using the data and performs a required processing.

What is claimed is:

1. A data processing apparatus for distributing to a user terminal a terminal module that is a program for obtaining license data used for decoding an encrypted digital content, using a public key infrastructure, the data processing apparatus comprising:

a storage device to store an encryption key;

a generation device to encrypt, using the encryption key, a public key certificate for encryption communications based on the public key infrastructure and information about a private key corresponding to the public key of the public key certificate, and to generate encryption information; and a transmission device to transmit to the user terminal the encryption information and a terminal module which includes a decoding key for decoding the encryption information.

2. The data processing apparatus of claim 1, wherein the terminal module decodes the encryption information after being activated on the user terminal and obtains both the public key certificate and the information about the private key.

3. A data processing apparatus for receiving an access request for a digital content from a user terminal and for distributing license data used for accessing the digital content to the user terminal as a response, the data processing apparatus comprising:

a storage device to store a plurality of access control lists in which a user with access permission, a permitted access pattern and a license condition including a number of operations granted for the digital content are described corresponding to the digital content;

a generation device to obtain an access control list, corresponding to a content identifier included in the access request and also corresponding to a user identifier of an applicant who transmits the access request, from the plurality of access control lists, and if a plurality of access control lists have been obtained, to select one access control list from the plurality of obtained access control lists, thereby generating individual license data based on the selected access control list; and a transmission device to transmit the individual license data to the user terminal.

4. A data processing apparatus for transmitting an access request for a digital content to a license distribution apparatus and receiving license data for accessing the digital content as a response from the license distribution apparatus, the data processing apparatus comprising:

a storage device to store the license data received from the license distribution apparatus, the license data including a plurality of access control lists in which both an access pattern permitted for the digital content and a license condition including a number of operations granted for the digital content are described, and information designating selection processing; and a selection device to implement the selection processing designated by the license data and to select one access control list from the plurality of access control lists.

5. A computer-readable storage medium storing a program for a computer which distributes to a user terminal a terminal module that is a program for obtaining license data for decoding an encrypted digital content, using a public key infrastructure, wherein the program directs the computer to perform the following operations:

encrypting a public key certificate for encryption communications based on the public key infrastructure and information about a private key corresponding to the public key of the public key certificate, using the encryption key stored in the storage device, and generating encryption information; and transmitting to the user terminal the encryption information and a terminal module which includes a decoding key for decoding the encryption information.

6. The medium of claim 5, wherein the terminal module decodes the encryption information after being activated on the user terminal and obtains both the public key certificate and the information about the private key.

7. A computer-readable storage medium storing a program for a computer which obtains license data for decoding an encrypted digital content from a license distribution apparatus, using a public key infrastructure, wherein the program directs the computer to perform the following operations:
   decoding encryption information stored in a storage device using a decoding key included in the program and obtaining both a public key certificate for encryption communications based on the public key infrastructure and information about a private key corresponding to the public key of the public key certificate;
   obtaining the license data from the license distribution apparatus by performing encryption communications using the public key certificate and the information about the private key.

8. A computer-readable storage medium storing a program for a computer which receives an access request for a digital content from a user terminal and distributes license data for accessing the digital content to the user terminal as a response, wherein the program directs the computer to perform the following operations:
   obtaining an access control list, corresponding to a content identifier included in the access request and also corresponding to a user identifier of an applicant who transmits the access request from a plurality of access control lists in which a user with access permission, a permitted access pattern and a license conditions including a number of operations granted for the digital content are described corresponding to the digital content;
   selecting one access control list from the plurality of obtained access control lists if there are a plurality of obtained access control lists; and
   generating individual license data based on the selected access control list.

9. The medium of claim 8, wherein the program directs the computer to further perform the following operations:
   comparing a relative distinguished name that represents a part of a distinguished name of a public key certificate and that is described in a license domain subject list of the selected access control list and a distinguished name of a public key certificate possessed by the user terminal; and
   distributing the individual license data to the user terminal when at least a part of a distinguished name of a public key certificate possessed by the user terminal matches the relative distinguished name.

10. The medium of claim 8, wherein the program directs the computer to further perform the following operations:
    describing an identifier of a public key certificate in the individual license data to be distributed to the user terminal; and
    when an identifier described in the individual license data and an identifier stored in a portable storage medium correspond to one another, the user terminal stores the individual license data in the portable storage medium.

11. The medium of claim 8, wherein the program directs the computer to further perform the following operations:
    storing log data showing a content operation classification that is permitted for the user terminal by the individual license data when the individual license data is transmitted to the user terminal.

12. The medium of claim 8, wherein
    the individual license data includes a plurality of license conditions and a plurality of decoding keys to access each of a plurality of digital contents.

13. The medium of claim 8, wherein the program directs the computer to further perform the following operations:
    comparing an authentic method of a user described in the individual license data and an authentic method in which the applicant has been already authenticated, and not-distributing the individual license data to the user terminal in a case where the authentic method described in the individual license data does not match the authenticated authentic method.

14. A computer-readable storage medium storing a program for a computer which transmits an access request for a digital content to a license distribution apparatus and receives an access request for a digital content from a user terminal as a response, wherein the program directs the computer to perform the following operations:
    referring to license data received from the license distribution apparatus and stored in a storage device, the license data including a plurality of access control lists in which both an access pattern permitted for the digital content and a license conditions including a number of operations granted for the digital content are described, and information designating a selection processing; and
    implementing the selection processing designated by the license data; and
    selecting one access control list from the plurality of access control lists.

15. The storage medium according to claim 14, wherein the program directs the computer to further perform the following operations:
    when a user accesses the digital content using the license data, to copy a part of the digital content and to put the copied part on a clipboard, encrypting data of the copied part and putting the encrypted data on the clipboard; and
    when a person with permission implements a paste operation, decoding data of the copied part and pasting the decoded data.

16. A data processing method of distributing to a user terminal a terminal module that is a program for obtaining license data used for decoding an encrypted digital content, using a public key infrastructure, said method comprising:
    encrypting both a public key certificate for encryption communications based on the public key infrastructure and information about a private key corresponding to the public key of the public key certificate, using an encryption key stored in a storage device, and generating encryption information; and
    transmitting to the user terminal the encryption information and a terminal module which includes a decoding key for decoding the encryption information.

17. The method of claim 16, wherein the terminal module decodes the encryption information after being activated on the user terminal and obtains both the public key certificate and the information about the private key.

18. A data processing method for receiving an access request for a digital content from a user terminal and distributing license data used for accessing the digital content to the user terminal as a response, the method comprising:
    obtaining an access control list, corresponding to a content identifier included in the access request and also corresponding to a user identifier of an applicant who transmits the access request from a plurality of access control lists stored in a storage device, in which a user with access permission, a permitted access pattern and a license condition including a number of operations granted for the digital content are described corresponding to the digital content;
    selecting one access control list from the plurality of obtained access control lists if there are a plurality of obtained access control lists; and generating individual license data based on the selected access control list.

19. A data processing apparatus for distributing to a user terminal a terminal module that is a program of obtaining license data for decoding an encrypted digital content, using a public key infrastructure, said apparatus comprising:

storage means for storing an encryption key;

generation means for encrypting, using the encryption key, a public key certificate for encryption communications based on the public key infrastructure and information about a private key corresponding to the public key of the public key certificate and for generating encryption information; and transmission means for transmitting to the user terminal the encryption information and a terminal module which includes a decoding key for decoding the encryption information.

20. The apparatus of claim 19, wherein the terminal module decodes the encryption information after being activated on the user terminal and obtains both the public key certificate and the information about the private key.

21. A data processing apparatus for receiving an access request for a digital content from a user terminal and for distributing license data for accessing the digital content to the user terminal as a response, said apparatus comprising:

storage means for storing a plurality of access control lists in which a user with access permission, a permitted access pattern and a license condition including a number of operations granted for the digital content are described;

generation means for obtaining an access control list, corresponding to a content identifier included in the access request and also corresponding to a user identifier of an applicant who transmits the access request, from the plurality of access control lists, and if a plurality of access control lists have been obtained, selecting one access control list from the plurality of obtained access control lists, thereby generating individual license data based on the selected access control list; and transmission means for transmitting the individual license data to the user terminal.

22. A data processing apparatus for transmitting an access request for a digital content to a license distribution apparatus and receiving license data used for accessing the digital content as a response from the license distribution apparatus, said apparatus comprising:

storage means for storing the license data received from the license distribution apparatus, the license data including a plurality of access control lists in which both an access pattern permitted for the digital content and a license conditions including a number of operations granted for the digital content are described, and information designating a selection processing; and selection means for implementing a selection processing designated by the license data and selecting one access control list from the plurality of access control lists.

* * * * *